(12) United States Patent
Lin

(10) Patent No.: US 7,567,711 B2
(45) Date of Patent: Jul. 28, 2009

(54) CLEANING UP OF HANDWRITING INTRA-STROKE AND INTER-STROKE OVERTRACING

(75) Inventor: Zhouchen Lin, Beijing (CN)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 11/195,580

(22) Filed: Aug. 1, 2005

(65) Prior Publication Data

US 2007/0025618 A1 Feb. 1, 2007

(51) Int. Cl.
*G06K 9/00* (2006.01)

(52) U.S. Cl. ............ 382/188; 382/185; 382/186; 382/187; 715/764; 715/209; 345/17

(58) Field of Classification Search ............ 382/188
See application file for complete search history.

(56) References Cited

U.S. PATENT DOCUMENTS

| | | | | | |
|---|---|---|---|---|---|
| 5,023,918 | A | * | 6/1991 | Lipscomb | 382/260 |
| 5,500,937 | A | * | 3/1996 | Thompson-Rohrlich | 715/764 |
| 5,577,135 | A | * | 11/1996 | Grajski et al. | 382/253 |
| 6,389,166 | B1 | * | 5/2002 | Chang et al. | 382/188 |
| 6,393,395 | B1 | * | 5/2002 | Guha et al. | 704/232 |
| 6,839,464 | B2 | * | 1/2005 | Hawkins et al. | 382/187 |
| 2003/0086611 | A1 | * | 5/2003 | Loudon et al. | 382/186 |

OTHER PUBLICATIONS

Impedovo, S. L. Ottaviano and S. Occhinegro, "Optical Character Recognition—A Survey," International Journal of Pattern Recognition and Artificial Intelligence, vol. 5 No. 1 & 2, 1991, World Scientific Publishing Company, pp. 1-24.

Govindan, V. K. and A. P. Shivaprasad, "Character Recognition—A Review," Pattern Recognition, vol. 23 No. 7, 1990, Pattern Recognition Society, pp. 671-683.

Plamondon, Rejean and Sargur N. Srihari, "On-Line and Off-Line Handwriting Recognition: A Comprehensive Survey," IEEE Transactions on Pattern Analysis and Machine Intelligence, vol. 22 No. 1, Jan. 2000, pp. 63-84.

Tappert, Charles C., Ching Y. Suen and Toru Wakahara, "The State of the Art in On-Line Handwriting Recognition," IEEE Transactions on Pattern Analysis and Machine Intelligence, vol. 12 No. 8, Aug. 1990, pp. 787-808.

Wakahara, Toru, Hiroshi Murase and Kazumi Odaka, "On-Line Handwriting Recognition," Proceedings of the IEEE, vol. 80 No. 7, Jul. 1992, pp. 1181-1194.

Nouboud, Fathallah and Rejean Plamondon, "On-Line Recognition of Handprinted Characters: Survey and Beta Tests," Pattern Recognition, vol. 23 No. 9, 1990, Pattern Recognition Society, pp. 1031-1044.

(Continued)

*Primary Examiner*—Brian Q Le
*Assistant Examiner*—Edward Park
(74) *Attorney, Agent, or Firm*—Perkins Coie LLP

(57) ABSTRACT

A method and system for cleaning handwriting for redisplay of the handwriting or for improved recognition accuracy is provided. The cleanup system receives handwriting that has been digitized. The cleanup system then analyzes the handwriting to identify strokes that satisfy a cleanup criterion. When a stroke has been identified as satisfying some cleanup criteria, the cleanup system cleans up the handwriting based on the detected criteria. In this way, the cleanup system generates handwriting that may have a more visually pleasing appearance to the reader.

17 Claims, 37 Drawing Sheets

OTHER PUBLICATIONS

Sklansky, Jack and Victor Gonzalez, "Fast Polygonal Approximation of Digitized Curves," Pattern Recognition, vol. 12, 1980, Pattern Recognition Society, pp. 327-331.

Huang, Weimin, Gang Rong and Zhaoqi Bian, "Strokes Recovering From Static Handwriting," IEEE, 1995, pp. 861-864.

Kato, Yoshiharu and Makoto Yasuhara, "Recovery of Drawing Order from Scanned Images of Multi-Stroke Handwriting," Proc. 5th Int. Conference Document Analysis and Recognition, Bangalore, India, Sep. 1999, pp. 261-264.

Lallican, P.M. and C. Viard-Gaudin, "A Kalman Approach for Stroke Order Recovering from Off-Line Handwriting," IEEE, 1997, pp. 519-522.

Bunke, H., R. Ammann, G. Kaufmann, M. Schenkel, R. Seiler and F. Eggimann, "Recovery of temporal information of cursively handwritten words for on-line recognition," IEEE, 1997, pp. 931-935.

Kegl, Balazs and Adam Krzyzak, "Piecewise Linear Skeletonization Using Principle Curves," IEEE Transactions on Pattern Analysis and Machine Intelligence, vol. 24 No. 1, Jan. 2002, pp. 59-74.

* cited by examiner

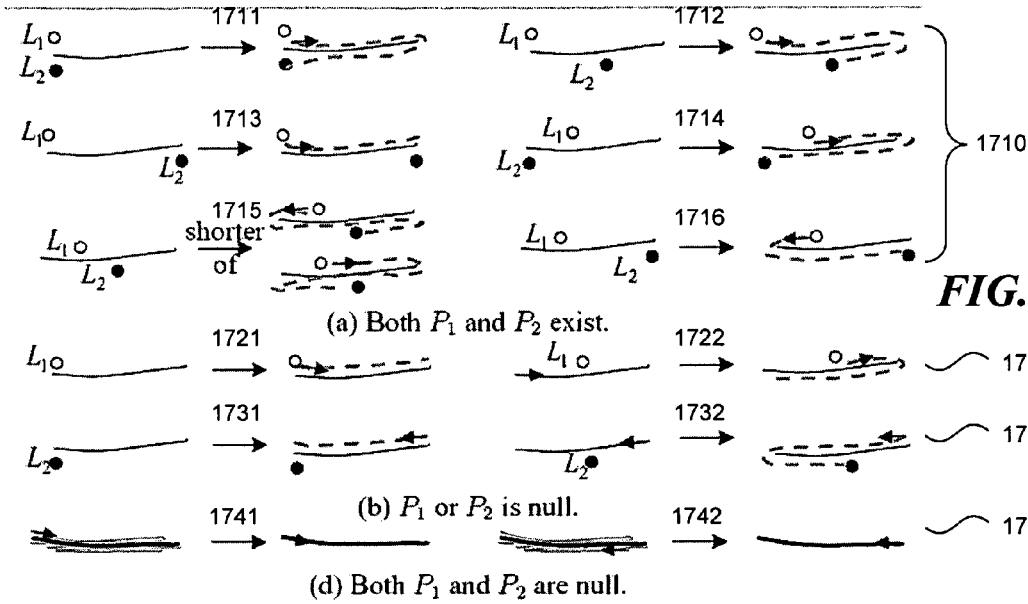
FIG. 17
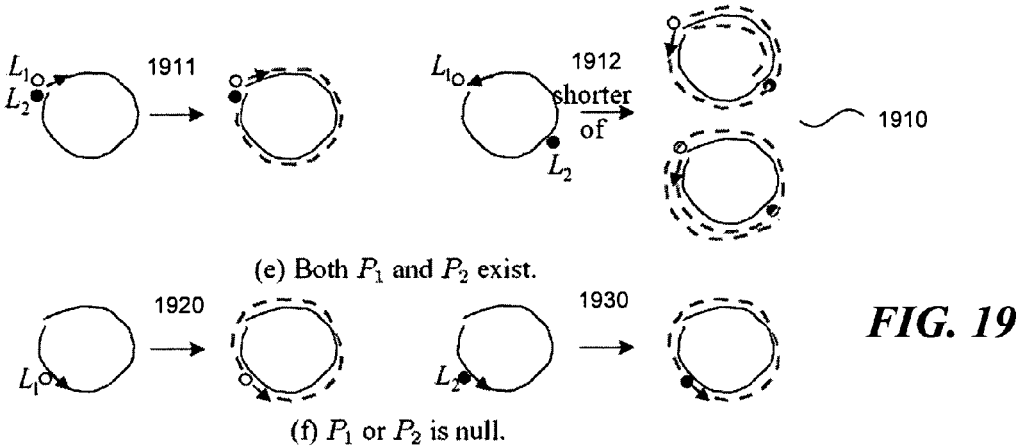
FIG. 19
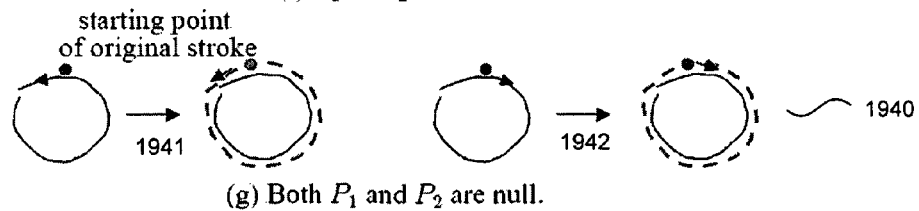

CLEANING UP OF HANDWRITING INTRA-STROKE AND INTER-STROKE OVERTRACING

BACKGROUND

Pen-based devices are receiving increasing acceptance in the market by people who want to digitally record their handwritten notes. There are many environments in which the digital recording of handwritten notes is useful. For example, a pen-based device may be used by a secretary to record minutes of a meeting, by medical personnel to record a summary of a patient's condition, by a student to record class notes, and so on. These pen-based devices include tablet PCs, personal digital assistants ("PDAs"), digital tablets, and so on.

Although handwritten notes may be recorded on paper and then scanned to produce digital recordings, the digital recording of handwriting that is contemporaneous with the generation of the handwriting has several advantages. One advantage is that the contemporaneous digital recording allows the handwritten document to be immediately available for transmission (e.g., via electronic mail) to others. Another advantage is that the contemporaneous digital recording facilitates the recognition of the handwriting. A pen-based device may also record the timing and directional information of the handwriting as it is digitally recorded, which can be used to improve handwriting recognition.

When people generate handwritten notes, the notes may appear less than perfect for several reasons. One reason is that it is common for people to make an error and then try to correct that error. For example, a person may omit a letter in a word and then try to insert that letter back into the word at a later time by squeezing it between two existing letters of the word. Another reason is that people often overwrite a letter or word, which adversely affects the clarity of the handwriting. Another reason is that two letters may overlap because of carelessness of the writer, which makes the handwriting appear sloppy and difficult to read. These reasons may also make the automatic recognition of handwritten notes more difficult. In addition, handwriting recognition may be more difficult for other reasons. For example, some people may be sloppy in their placement and forming of dots (e.g., in a "j") and bars (e.g., across an "H" or "tt").

SUMMARY

A method and system for cleaning handwriting for redisplay of the handwriting or for improved recognition accuracy is provided. The cleanup system receives handwriting that has been digitized. The cleanup system then analyzes the handwriting to identify strokes that satisfy a cleanup criterion. When a stroke has been identified as satisfying a cleanup criterion, the cleanup system cleans up the handwriting based on the detected criterion. In this way, the cleanup system generates handwriting that may have a more visually pleasing appearance to the reader. The cleanup system may also change the writing order of various strokes. Although the reordering may not the change the visual appearance of the handwriting, it may help with automatic recognition of the handwriting.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 17 is a diagram that illustrates the determining of writing order for an open stroke piece in one embodiment.

FIG. 19 is a diagram that illustrates the determining of writing order for a closed stroke piece in one embodiment.

DETAILED DESCRIPTION

A method and system for cleaning handwriting for redisplay of the handwriting or for improved recognition accuracy is provided. In one embodiment, the cleanup system receives handwriting that has been digitized. For example, the digitized handwriting may identify the ink of each stroke of the handwriting by x-coordinate and y-coordinate of each point along the stroke at a resolution of the tablet used to input the handwriting. The digitized handwriting may also include a timestamp associated with each point or stroke. The cleanup system then analyzes the handwriting to identify strokes that satisfy a cleanup criteria. For example, one cleanup criterion may be that a stroke overtraces itself, which is referred to as "intra-stroke overtracing." Another cleanup criterion may be that one stroke overtraces another stroke, which is referred to as "inter-stroke overtracing." When a stroke has been identified as satisfying a cleanup criterion, the cleanup system cleans up the handwriting based on the detected criterion. For example, when intra-stroke overtracing is detected, the cleanup system may replace the overtracing parts of the stroke with a single line that is derived from the overtracing parts. In this way, the cleanup system generates handwriting that may have a more visually pleasing appearance to the reader. The cleanup system may also change the writing order of various strokes. For example, the cleanup system may change the temporal order of the bar crossing the letter "t" in the word "time" that was written after the letter "e" to before the writing of the word. This reordering will place the bar in temporal proximity to the stem of the letter "t." Although this reordering may not the change the visual appearance of the handwriting, it may help with automatic recognition of the handwriting.

Figure 1:
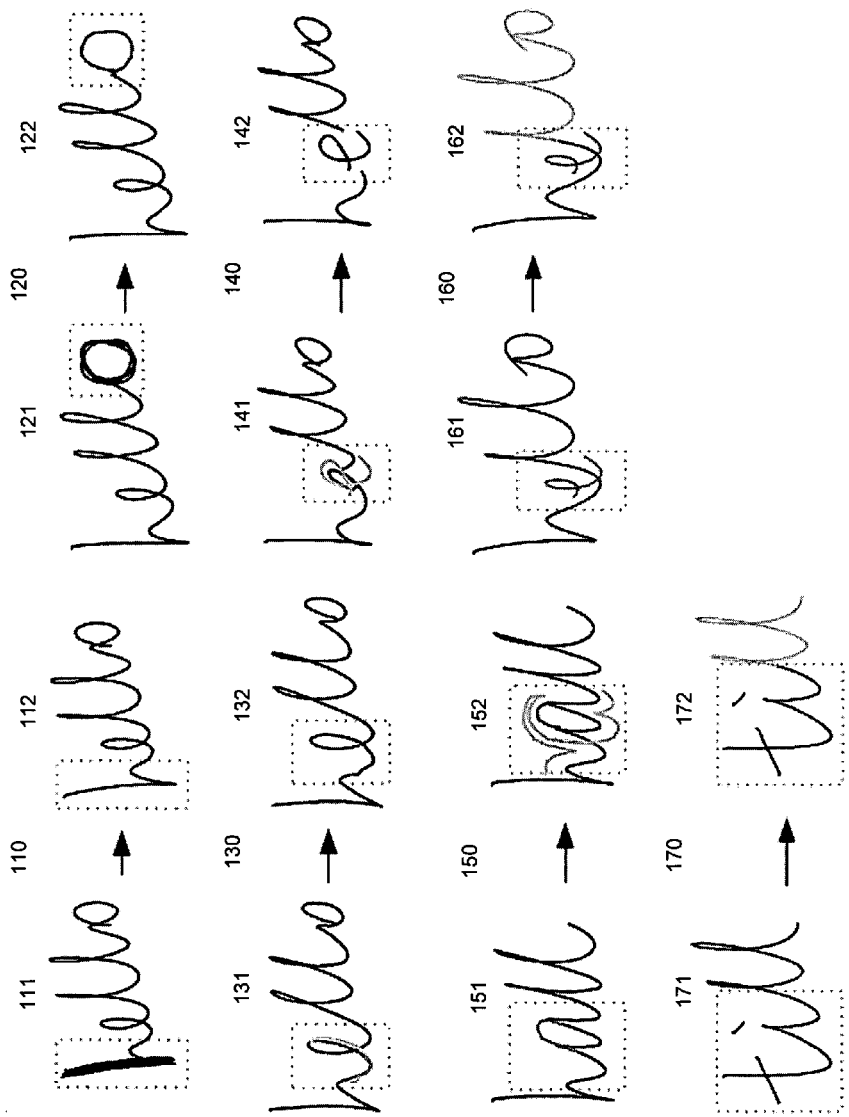
FIG. 1 illustrates various types of cleanups performed by the cleanup system in one embodiment.

The cleanup system provides various techniques for improving the appearance and recognition of handwriting. In one embodiment, the cleanup system cleans up overtracing of characters, corrections to the handwriting, letters that touch, and insertions into words. The cleanup system may also reorder strokes to improve handwriting recognition. FIG. 1 illustrates various types of cleanups performed by the cleanup system in one embodiment. Handwriting 110 illustrates an example of the cleanup of intra-stroke overtracing. Intra-stroke overtracing occurs when ink from a single stroke overwrites itself. Handwriting 111 indicates that the vertical bar of the letter "h" has been overtraced. Handwriting 112 indicates the vertical bar of the letter "h" after it has been cleaned up. Handwriting 120 illustrates another example of the cleanup of intra-stroke overtracing. Handwriting 121 indicates that the letter "o" has been overtraced. Handwriting 122 indicates the letter "o" after it has been cleaned up. Handwriting 130 illustrates an example of the cleanup of inter-stroke overtracing. Inter-stroke overtracing occurs when ink from one stroke overwrites the ink of another stroke. Handwriting 131 illustrates that inter-stroke overtracing occurred as the writer wrote stroke 133 over the already written word to fill in a gap between the "h" and the "e." Handwriting 132 illustrates the cleanup of the overwritten stroke. The cleanup system merges the overwriting stroke with the overwritten stroke resulting in one stroke. Handwriting 140 illustrates an example of the cleanup of character correction. Handwriting 141 indicates that the "a" in "hallo" has been overwritten with an "e" in an attempt to form the word "hello." Handwriting 142 indicates the cleanup of the word by replacing the overwritten stroke with the overwriting stroke. Handwriting 150 illustrates an example of the cleanup of the touchup of the handwriting. Handwriting is touched up when a user places a short stroke over the handwriting in an attempt to make the handwriting clear. Handwriting 151 indicates that the word "hull" was touched up by stroke 153 placed over the letter "u" to convert it to the letter "a" and the word "hall." Handwriting 152 indicates the cleaned up handwriting is the word "hall." The cleanup system may also reorder the strokes 154 of the handwriting so that the order is the same as if the handwriting had originally been written correctly. This reordering of the strokes helps improve automatic handwriting recognition. Handwriting 160 illustrates an example of the cleanup of an insertion. Handwriting 161 indicates that the letter "e" was inserted between the letter "h" and the letter "l" of the handwritten "hllo" in attempt to correct the spelling to the word "hello." Handwriting 162 indicates that the strokes have been temporally reordered so that the order is the same as if the handwriting had originally been written correctly. Handwriting 170 illustrates the cleanup based on a late stroke. Handwriting 171 indicates that the bar on the letter "t" and the dot on the letter "i" were written after the letters "ll" in the word "till." Handwriting 172 indicates that the strokes are temporally reordered so that the bar is just before the stem of the letter "t" and the dot is just after the stem of the letter "i."

Figure 2:
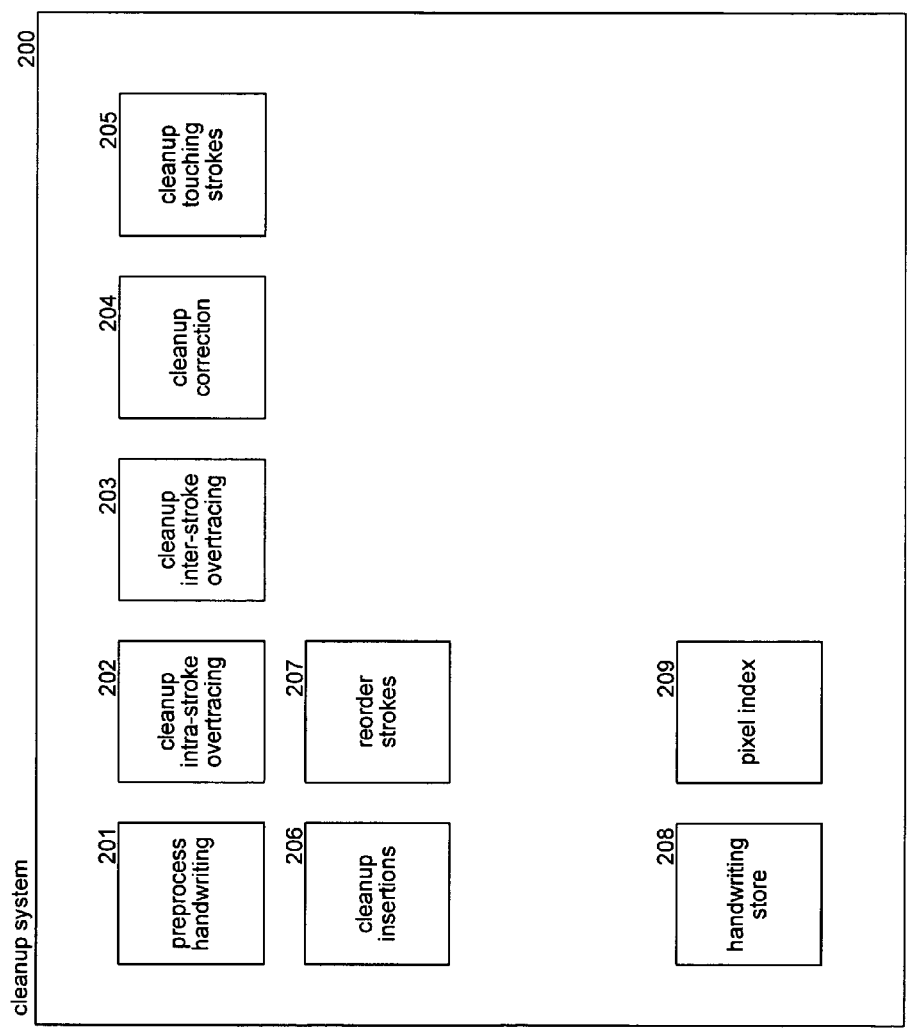
FIG. 2 is a block diagram that illustrates components of the cleanup system in one embodiment.
Figure 3:
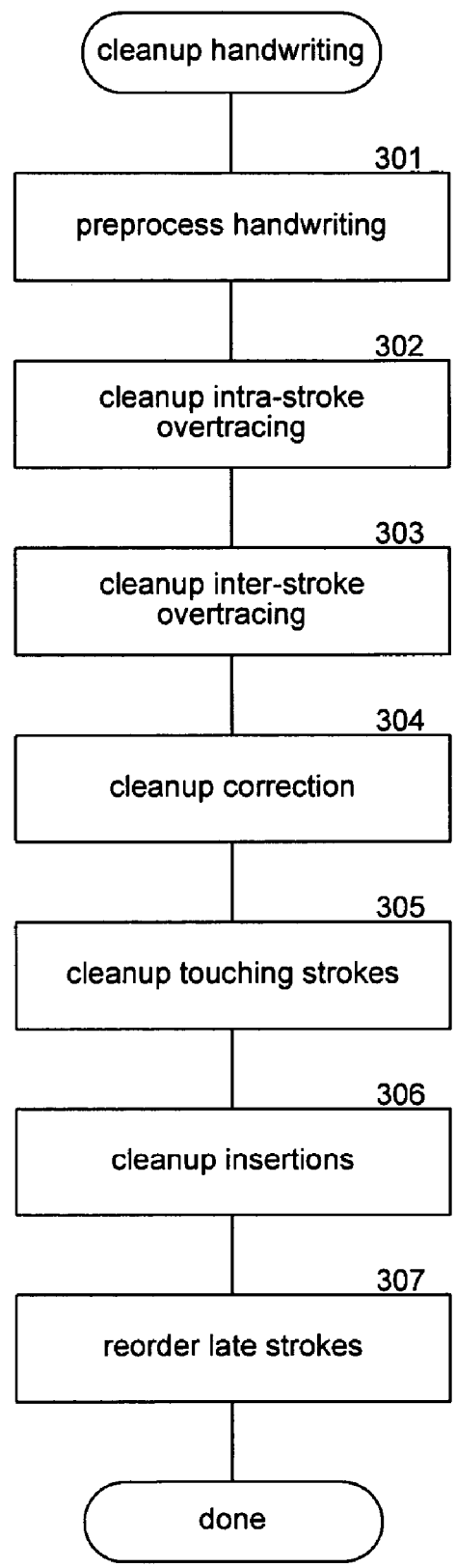
FIG. 3 is a flow diagram that illustrates the ordering of the invocation of these components of the cleanup system in one embodiment.

FIG. 2 is a block diagram that illustrates components of the cleanup system in one embodiment. The cleanup system includes a preprocess handwriting component 201, a cleanup intra-stroke overtracing component 202, a cleanup inter-stroke overtracing component 203, a cleanup correction component 204, a cleanup touching strokes component 205, a cleanup insertions component 206, and a reorder strokes component 207. The names of these components are descriptive of their function. The cleanup system also includes a handwriting store 208 and a pixel index 209. The handwriting store contains the handwriting to be cleaned up. The preprocess handwriting component generates the pixel index that for each pixel identifies various attributes of the handwriting that pertain to that pixel. For example, an attribute of a pixel may indicate the number of strokes that are near that pixel. The generation of the pixel index allows various attributes to be calculated once and used by multiple components of the cleanup system. FIG. 3 is a flow diagram that illustrates the ordering of the invocation of these components of the cleanup system in one embodiment. The flow diagram illustrates that the preprocess handwriting component is invoked first and the reorder late strokes component is invoked last.

The computing devices on which the cleanup system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the cleanup system. In addition, the data structures and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the cleanup system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The user devices may be cell phones, personal digital assistants, smart phones, personal computers, programmable consumer electronics, digital cameras, and so on.

The cleanup system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
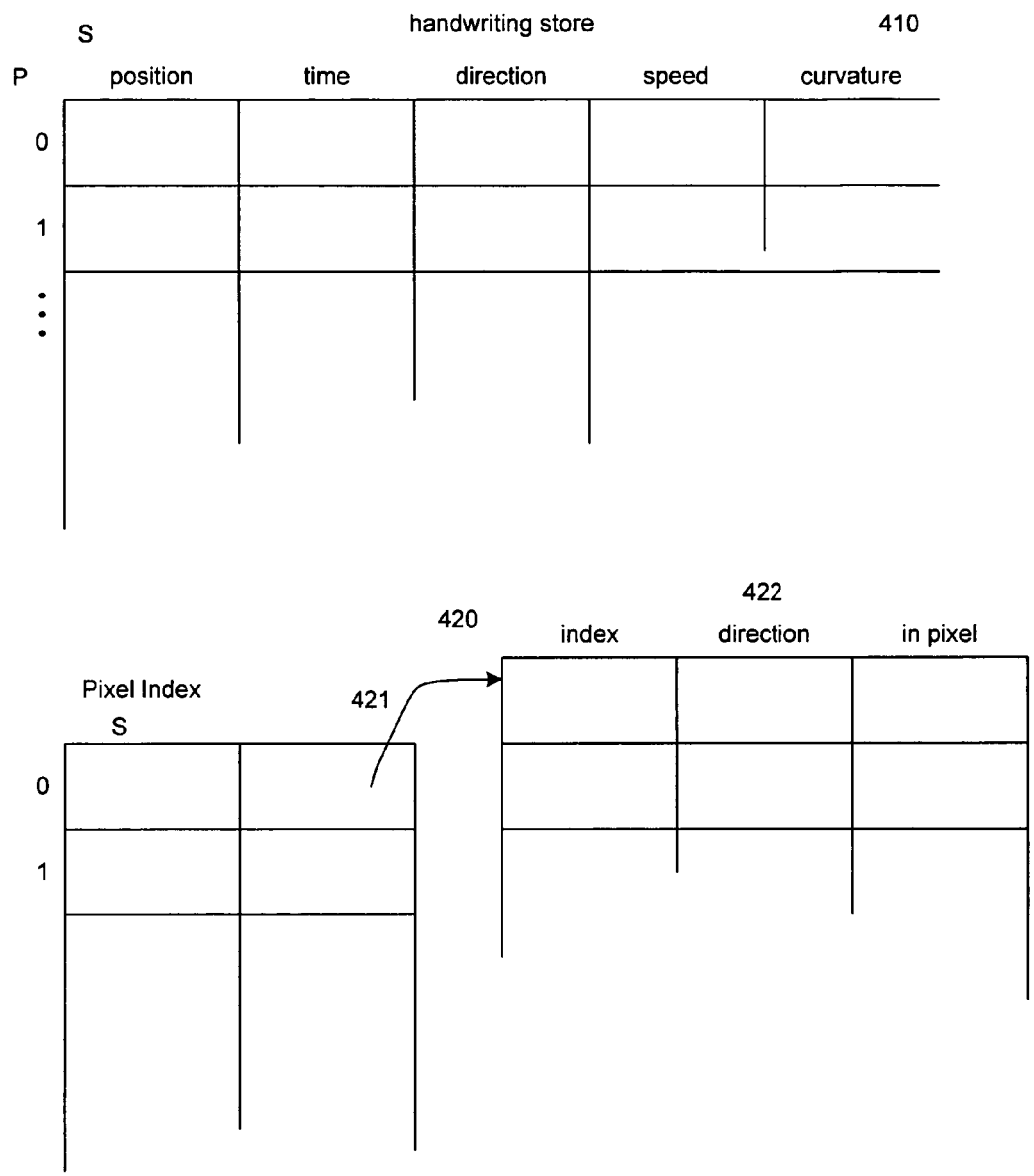
FIG. 4 is a block diagram that illustrates example data structures of the cleanup system in one embodiment.

FIG. 4 is a block diagram that illustrates example data structures of the cleanup system in one embodiment. Table 410 illustrates the data stored for each stroke of the handwriting; that is, each stroke of the handwriting has a table corresponding to table 410. The table contains an entry for each point P of stroke S. Each entry contains the position of the point (e.g., x-coordinate and y-coordinate), time the point was recorded, direction of stroke when the point was written, and so on. Table 420 illustrates the data stored for each pixel of the pixel index. Each pixel has a table 421 that has an entry for each stroke of the handwriting that is near that pixel. Each entry identifies the stroke by index in the handwriting store and it points to table 422. Table 422 contains an entry for each point on the stroke that is near the pixel. Each entry identifies the index of the point within the stroke, the direction of the point, and whether the point is within the pixel. The generation of the pixel index is described in detail below.

Preprocess Handwriting

Figure 5:
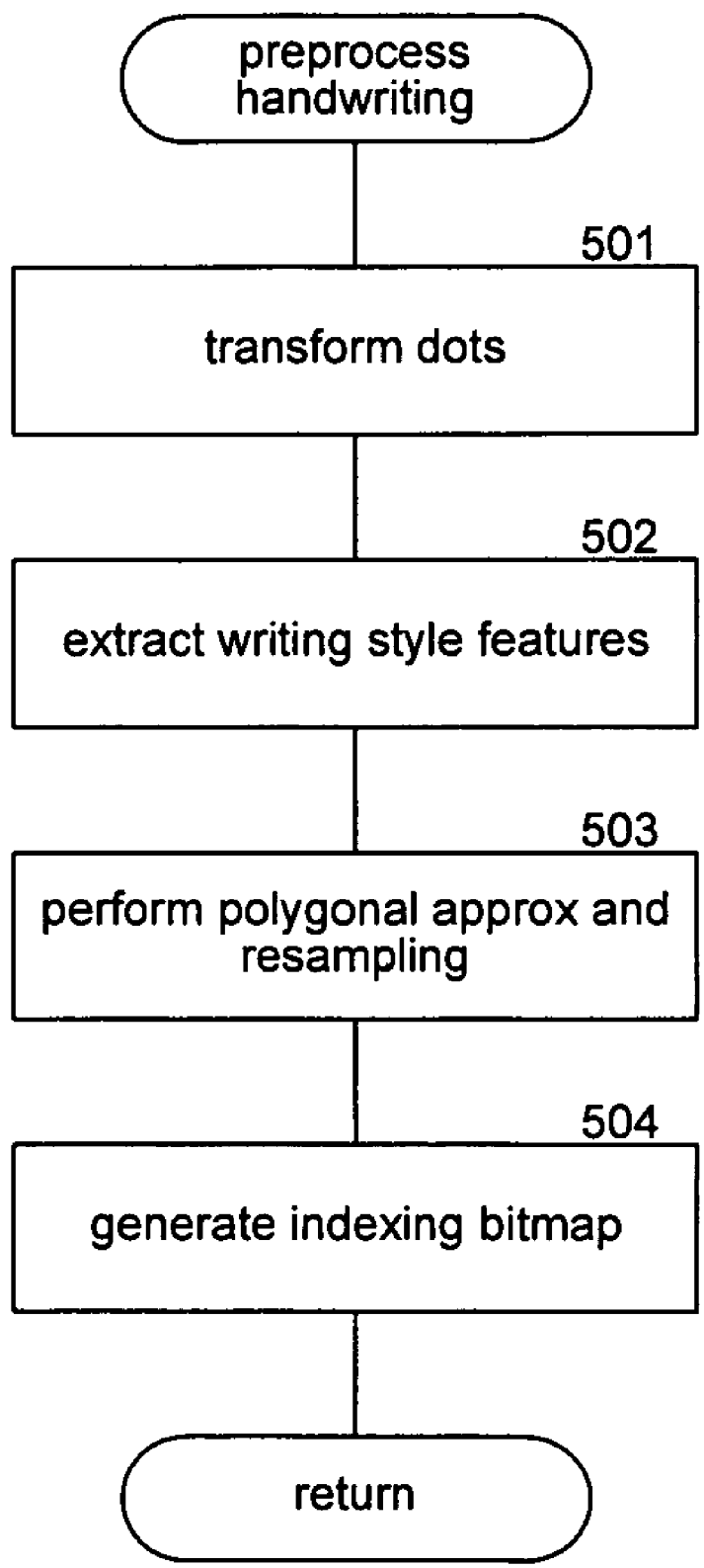
FIG. 5 is a flow diagram that illustrates the processing of the preprocess handwriting component in one embodiment.
Figure 6:
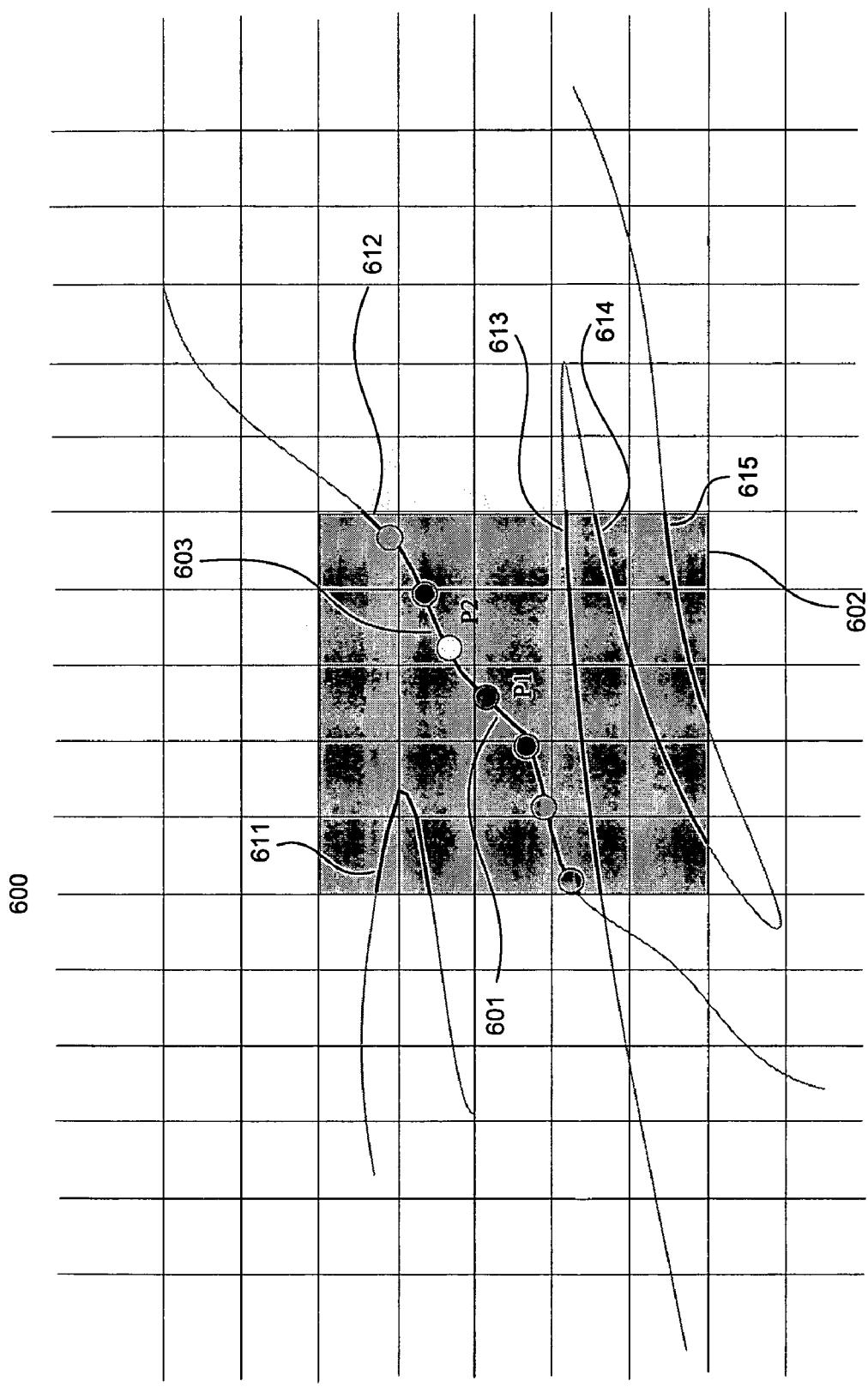
FIG. 6 is a diagram that illustrates the generation of the pixel index in one embodiment.

FIG. 5 is a flow diagram that illustrates the processing of the preprocess handwriting component in one embodiment. In block 501, the component transforms dots of the handwriting from small circles to a short stroke. Some writers write dots for the letters "i" and "j" as small circles, which may present problems for handwriting recognition. In block 502, the component extracts writing style features of the handwriting. The writing style features include dynamic information, slant estimation, and average character width estimation. In block 503, the component performs a polygonal approximation and equidistance resampling. In one embodiment, the component uses Sklansky's polygonal approximation to each stroke and equally distant resamples each stroke. See, Sklansky, J. and Gonzalez, V., "Fast Polygonal Approximation of Digitized Curves," Pattern Recognition, vol. 12, pp. 321-327, 1980. The cleanup system performs the cleanup using the information of the resampled strokes and applies the cleanup to the original strokes. In block 504, the component generates the pixel index. FIG. 6 is a diagram that illustrates the generation of the pixel index in one embodiment. The handwriting is logically divided into a grid of pixels that is approximately twice the size of the resampling. For each pixel 601, the component aggregates information from neighboring pixels 602. In one embodiment, neighboring pixels of a pixel may be defined as the pixels within a 3-by-3 or 5-by-5 pixel area with the pixel at the center. In this example, the neighboring 5-by-5 pixels contain five stroke fragments 611-615 with fragments 613-615 being from the same stroke. The component may generate the pixel index using dynamic programming techniques by tracing the points along each stroke of the handwriting. For example, the aggregate information for pixel 603 includes information from 16 out of the 25 neighboring pixels of pixel 601.

Figure 7:
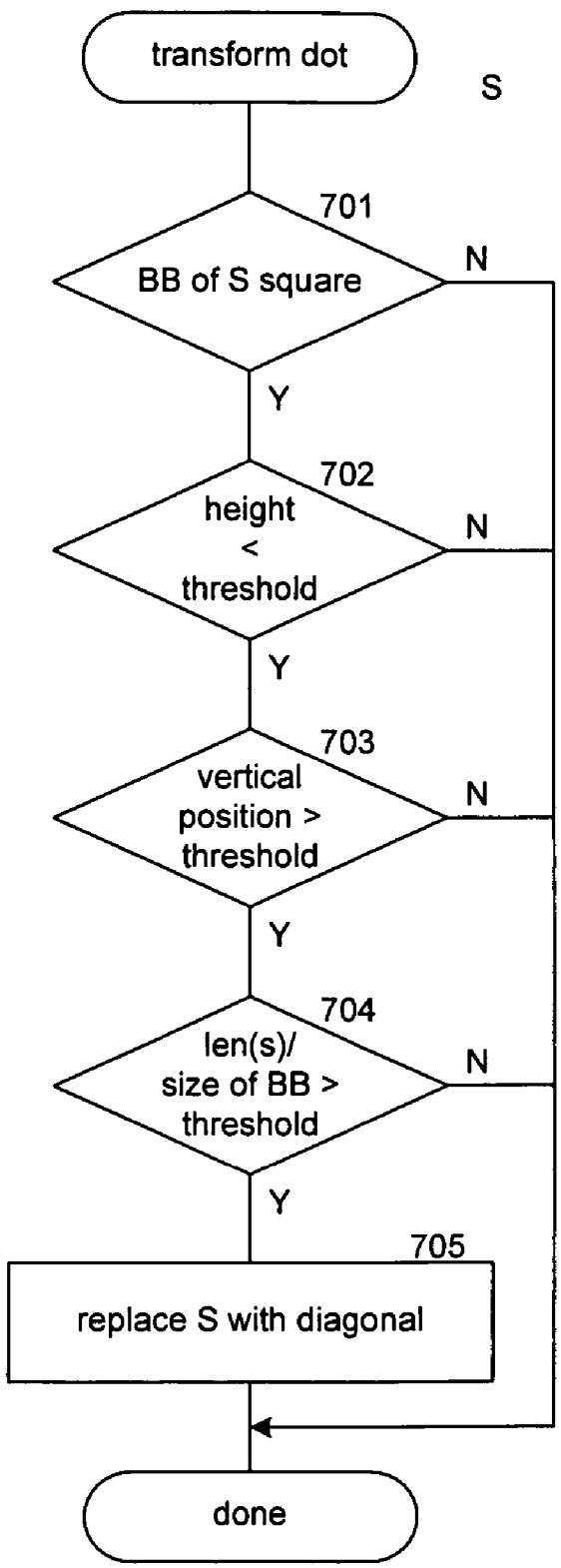
FIG. 7 is a flow diagram that illustrates the processing of the transform dot component in one embodiment.

FIG. 7 is a flow diagram that illustrates the processing of the transform dot component in one embodiment. The component is passed a stroke and replaces small circular dots with a line stroke. In decision block 701, if the bounding box of the stroke is approximately a square, then the stroke may be a dot and the component continues at block 702, else the component completes. In decision block 702, if the height of the bounding box of the stroke is less than a threshold height, then the stroke may be small enough to be a dot and the component continues at block 703, else the component completes. In decision block 703, if the vertical position is above a threshold position determined from the bounding box of the handwriting, then the stroke may be high enough to be a dot and the component continues at block 704, else the component completes. In decision block 704, if the ratio of the length of the stroke to the size of the bounding box of the stroke is above a threshold, then this stroke is long enough to be circular within its bounding box to be a dot and the component continues at block 705, else the component completes. In block 705, since all the conditions for the passed stroke to be a dot have been met, the component replaces the stroke with a stroke that is a diagonal of the bounding box of the stroke and then completes.

Figure 8:
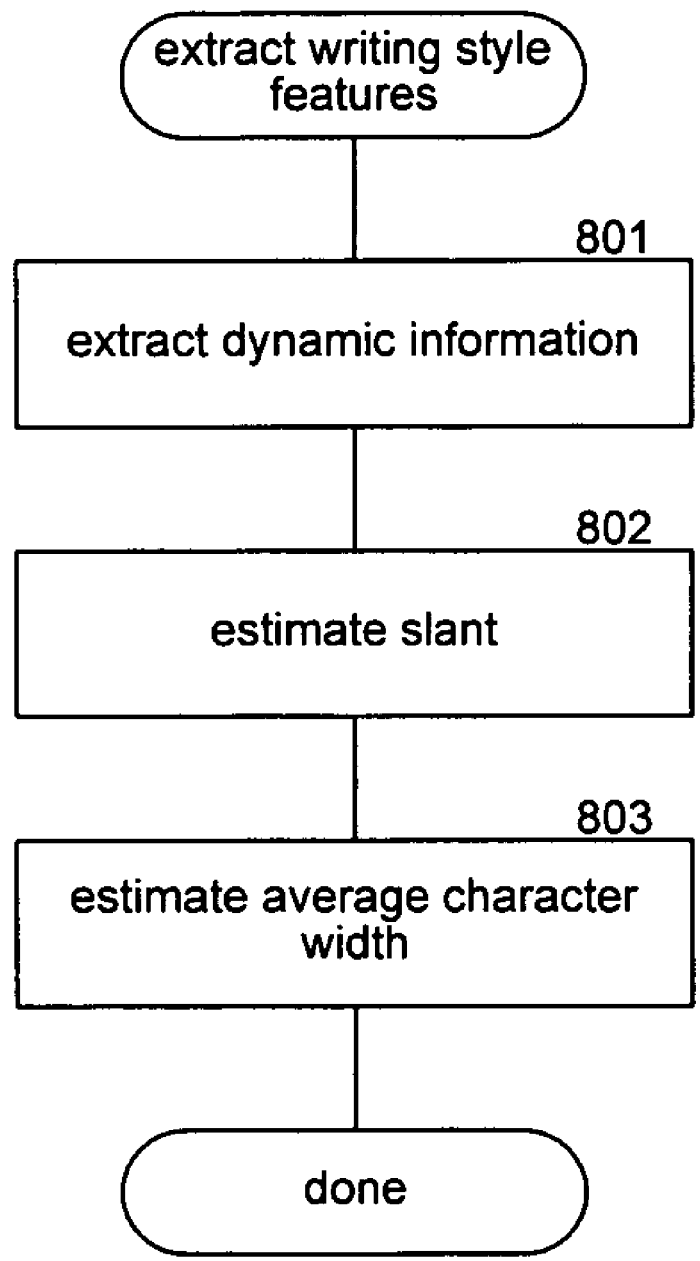
FIG. 8 is a flow diagram that illustrates the processing of the extract writing style features component in one embodiment.
Figure 9:
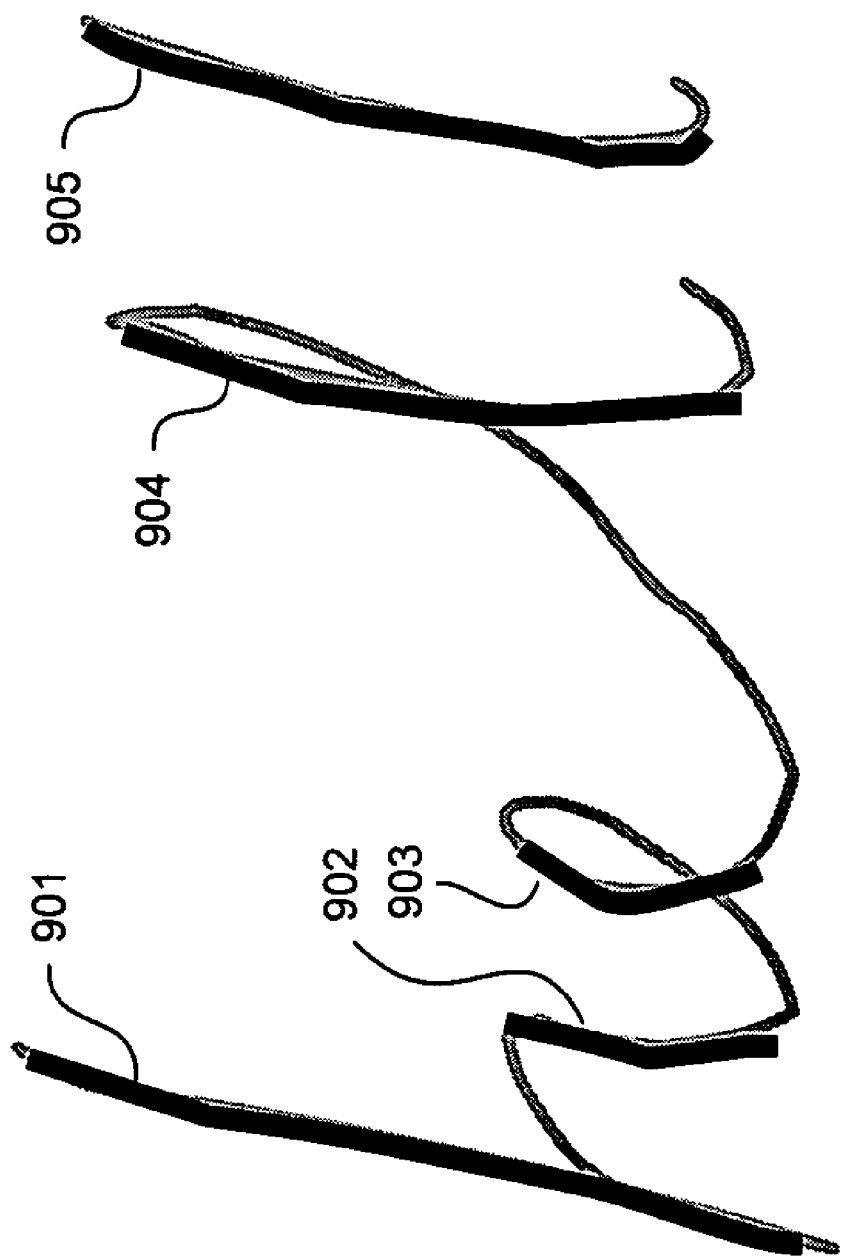
FIG. 9 is a diagram that illustrates slant estimation in one embodiment.

FIG. 8 is a flow diagram that illustrates the processing of the extract writing style features component in one embodiment. In block 801, the component extracts dynamic information from the input handwriting. The dynamic information includes timing of a stroke and, for each point, its writing speed, direction, and curvature. In block 802, the component estimates the slant of the handwriting, as illustrated in FIG. 9. In block 803, the component estimates the average width of the handwritten characters. The component initially finds the local minima that are below the central axis of the handwriting. The component sorts the x-coordinates of the local minima and determines the distance in the x direction between successive local minima. The component discards some of the longest distances and some of the shortest distances, such as the longest 25 percent and the shortest 25 percent. The component then calculates the average of the remaining distances and uses that as the average character width. The component then completes.

FIG. 9 is a diagram that illustrates slant estimation in one embodiment. The component initially identifies the downward pieces 901-905 of each stroke and then discards those pieces that are short. The component then estimates principal directions of the remaining pieces using linear regression. The component calculates the average of the directions. If the average direction is far from vertical, then the component estimates the slant to be vertical, else the component uses the average direction as the estimated slant of the handwriting.

Clean Up Intra-Stroke Overtracing

Figure 10:
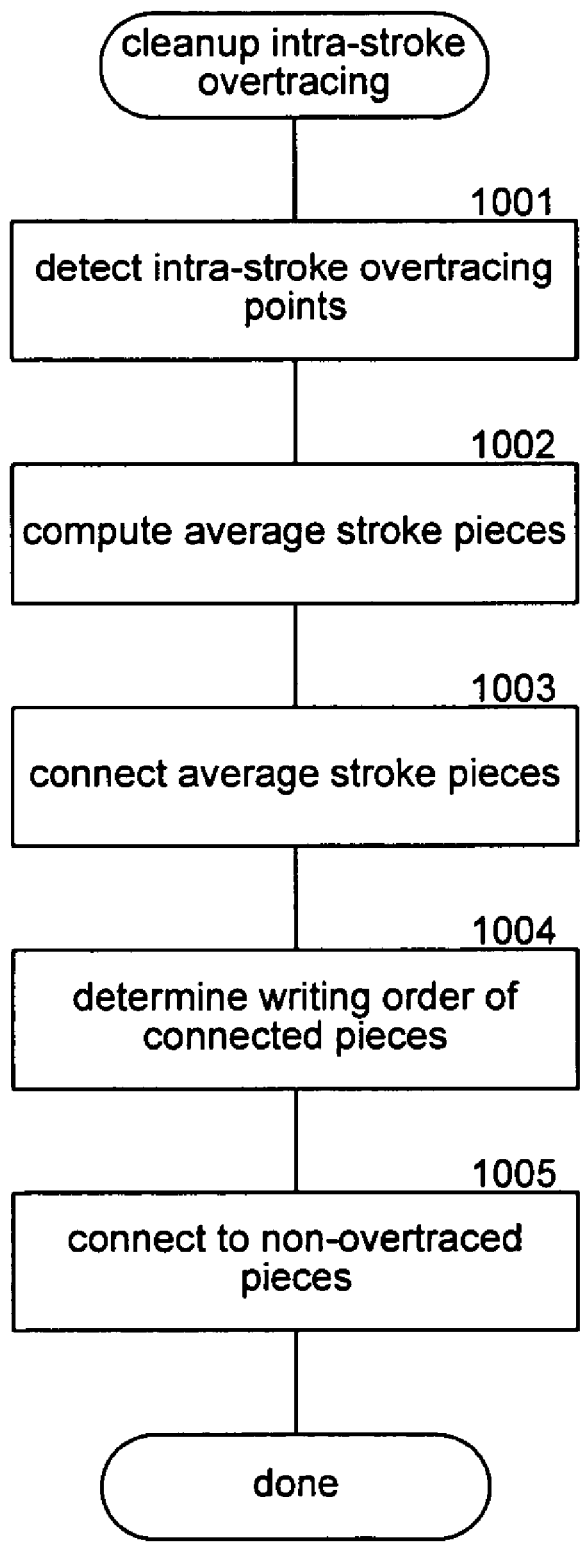
FIG. 10 is a flow diagram that illustrates the processing of the cleanup intra-stroke overtracing component in one embodiment.

FIG. 10 is a flow diagram that illustrates the processing of the cleanup intra-stroke overtracing component in one embodiment. The component cleans up a stroke that overtraces itself into a thin stroke or a stroke fragment. The component does not consider the backtracing of letters such as "l," "p," "m," and so on to be overtracing. In block 1001, the component detects intra-stroke overtracing points as illustrated in detail by FIG. 11. In block 1002, the component computes average stroke pieces from the overtracing points as illustrated in detail by FIG. 12. In block 1003, the component connects the average stroke pieces into a single piece. In block 1004, the component determines the writing order of the connected pieces. In block 1005, the component connects the connected average stroke piece to the non-overtraced pieces of the stroke and then completes.

Figure 11:
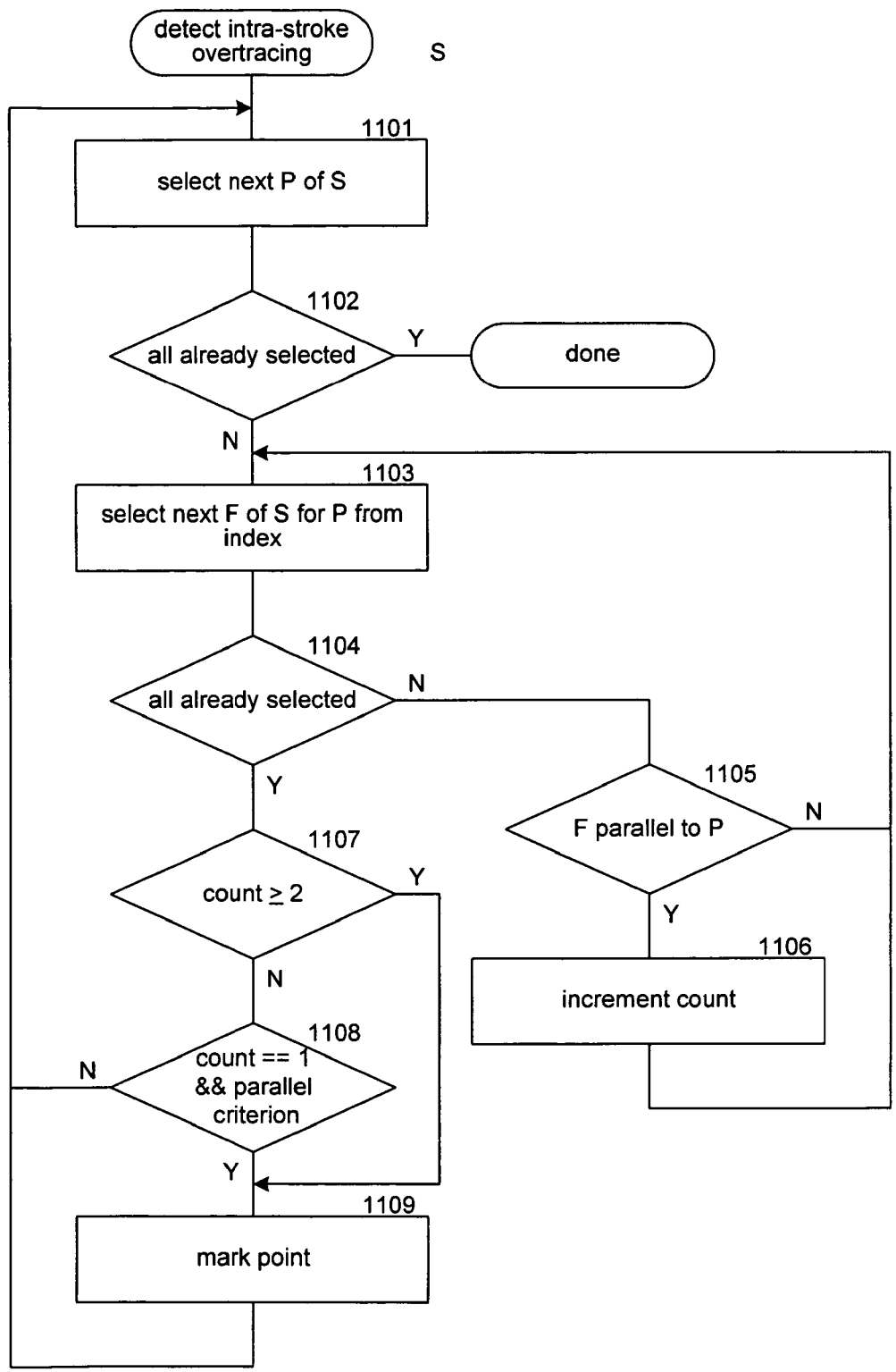
FIG. 11 is a flow diagram that illustrates the processing of the detect intra-stroke overtracing component in one embodiment.

FIG. 11 is a flow diagram that illustrates the processing of the detect intra-stroke overtracing component in one embodiment. The component is passed a stroke and loops determining whether each point of the stroke is an overtracing point. In block 1101, the component selects the next point of the stroke. In decision block 1102, if all the points of the stroke have already been selected, then the component completes, else the component continues at block 1103. In blocks 1103-1106, the component loops counting the number of fragments of the stroke that are near and parallel to the selected point. In block 1103, the component selects the next near fragment of the stroke for the selected point using the pixel index. In decision block 1104, if all the near fragments for the selected point have already been selected, then the component continues at block 1107, else the component continues at block 1105. In decision block 1105, if the selected fragment is parallel to the direction of the selected point, then the component increments a count of parallel fragments in block 1106. The component then loops to block 1103 to select the next fragment. In decision block 1107, if the count of parallel fragments is greater than or equal to 2, then the component continues at block 1109, else the component continues at block 1108. In decision block 1108, if the count of parallel fragments is equal to 1 and the fragment is nearly parallel to the point but not close to vertical (i.e., not a backtrace of letters such as "l" and "p"), then the component continues at block 1109, else the selected point is not an overtracing point and the component loops to block 1101 to select the next point. In block 1109, the component marks the selected point as an overtracing point and then loops to block 1101 to select the next point.

Figure 12:
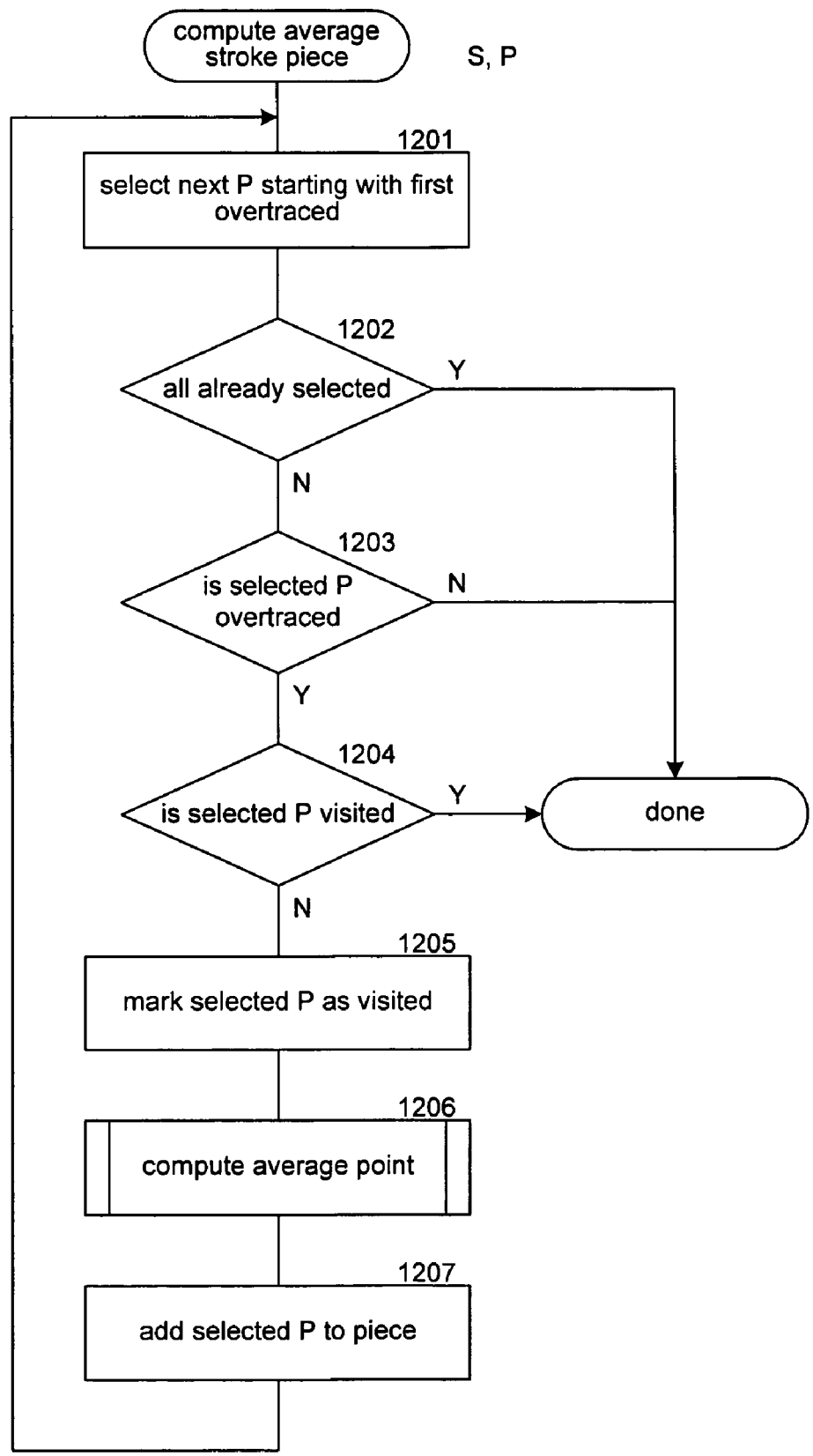
FIG. 12 is a flow diagram that illustrates the processing of a compute average stroke piece component in one embodiment.

FIG. 12 is a flow diagram that illustrates the processing of a compute average stroke piece component in one embodiment. The component is passed a point on a stroke and then calculates a weight for each overtracing point in a sequence that defines a piece. In block 1201, the component selects the next point of the stroke starting with the first overtracing point at or after the passed point. In decision block 1202, if a terminus of the stroke has been reached, then the component completes, else the component continues at block 1203. In decision block 1203, if the selected point is an overtracing point, then the component continues at block 1204, else the component completes. In decision block 1204, if the selected point has already been visited (as described below), then the component completes, else the component continues at block 1205. In block 1205, the component marks the selected point as visited. In block 1206, the component invokes a component to compute the average of the points of the stroke that are overtracing points. In block 1207, the component adds the average point to the piece being generated and then loops to block 1201 to select the next point of the stroke.

Figure 13:
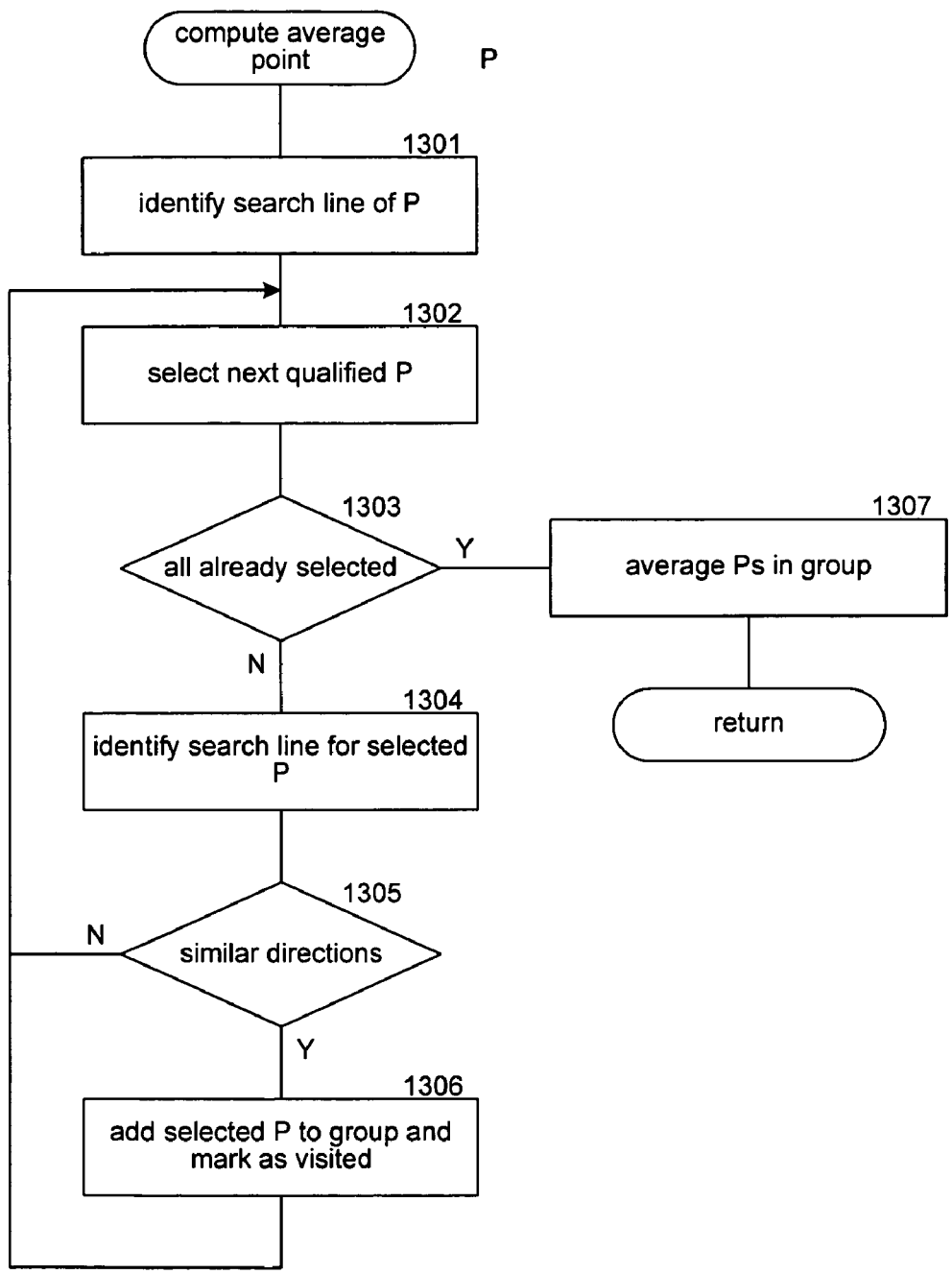
FIG. 13 is a flow diagram that illustrates the processing of the compute average point component in one embodiment.
Figure 14:
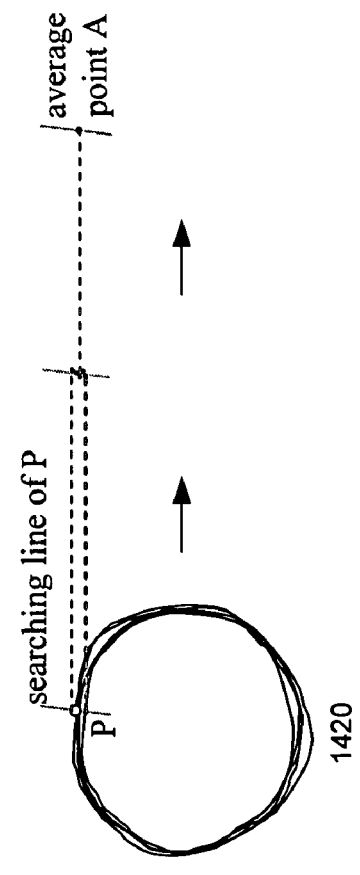
FIG. 14 is a diagram that illustrates the computing of an average point.
Figure 14:
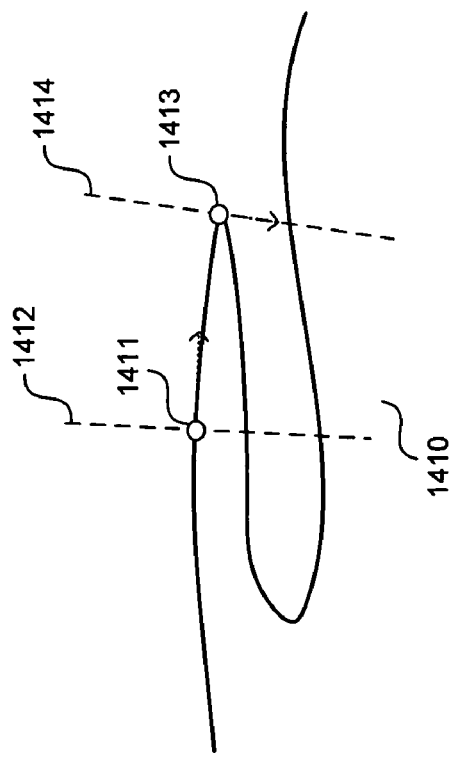

FIG. 13 is a flow diagram that illustrates the processing of the compute average point component in one embodiment. FIG. 14 is a diagram that illustrates the computing of an average point. The component computes the average of overtracing points that are found on a search line that is perpendicular to the direction of an overtracing point unless the point is the apex of the curvature. In such a case, the component uses a search line that is in the direction of the point. Stroke 1410 includes points 1411 and 1413. Line 1412 is the search line for point 1411, and line 1414 is the search line for point 1413. Diagram 1420 illustrates the computing of the average from points along the search line. The component searches pixels along the search line in both directions of the search line. If the pixel contains a point of the stroke whose own search line is close to the direction of the search line, then the component calculates the average of the points and projects the average onto the search line to give an average point. The component is passed a point that is to be replaced by an average point. In block 1301, the component identifies the search line of the passed point. In blocks 1302-1306, the component loops identifying points that should be used to compute the average, a "qualified point." In block 1302, the component selects the next qualified point along the search line. In decision block 1303, if all the qualified points have already been selected, then the component continues at block 1307, else the component continues at block 1304. In block 1304, the component identifies the search line for the selected point. In decision block 1305, if the search lines have similar directions, then the component continues at block 1306, else the component loops to block 1302 to select the next qualified point. In block 1306, the component adds the selected point to the group to be averaged and marks the selected point as visited. The component then loops to block 1302 to select the next qualified point. In block 1307, the component computes the average of the points in the group and then completes.

Figure 15:
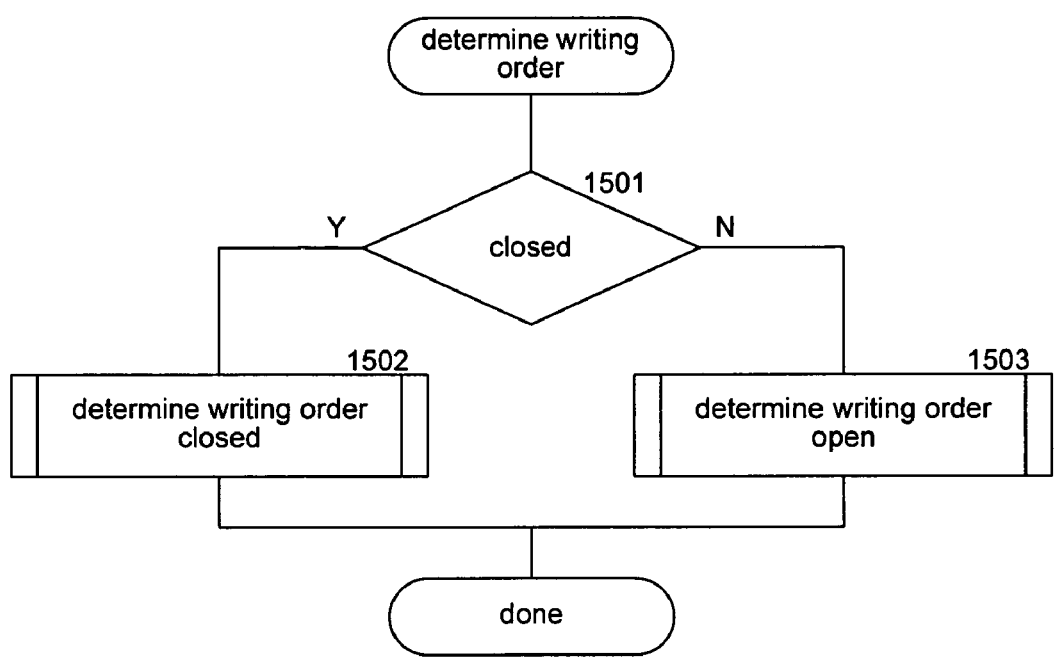
FIG. 15 is a flow diagram that illustrates the processing of the writing order determination component in one embodiment.

FIG. 15 is a flow diagram that illustrates the processing of the writing order determination component in one embodiment. The component determines the writing order of an average piece. In decision block 1501, if the piece is closed (e.g., the starting point of the piece is near its ending point), then the component continues at block 1502, else the component continues at block 1503. In block 1502, the component invokes the determine writing order closed component to determine the writing order for a closed (e.g., circular) piece and then completes. In block 1503, the component invokes the determine writing order open component to determine the writing order for an open piece and then completes.

Figure 16:
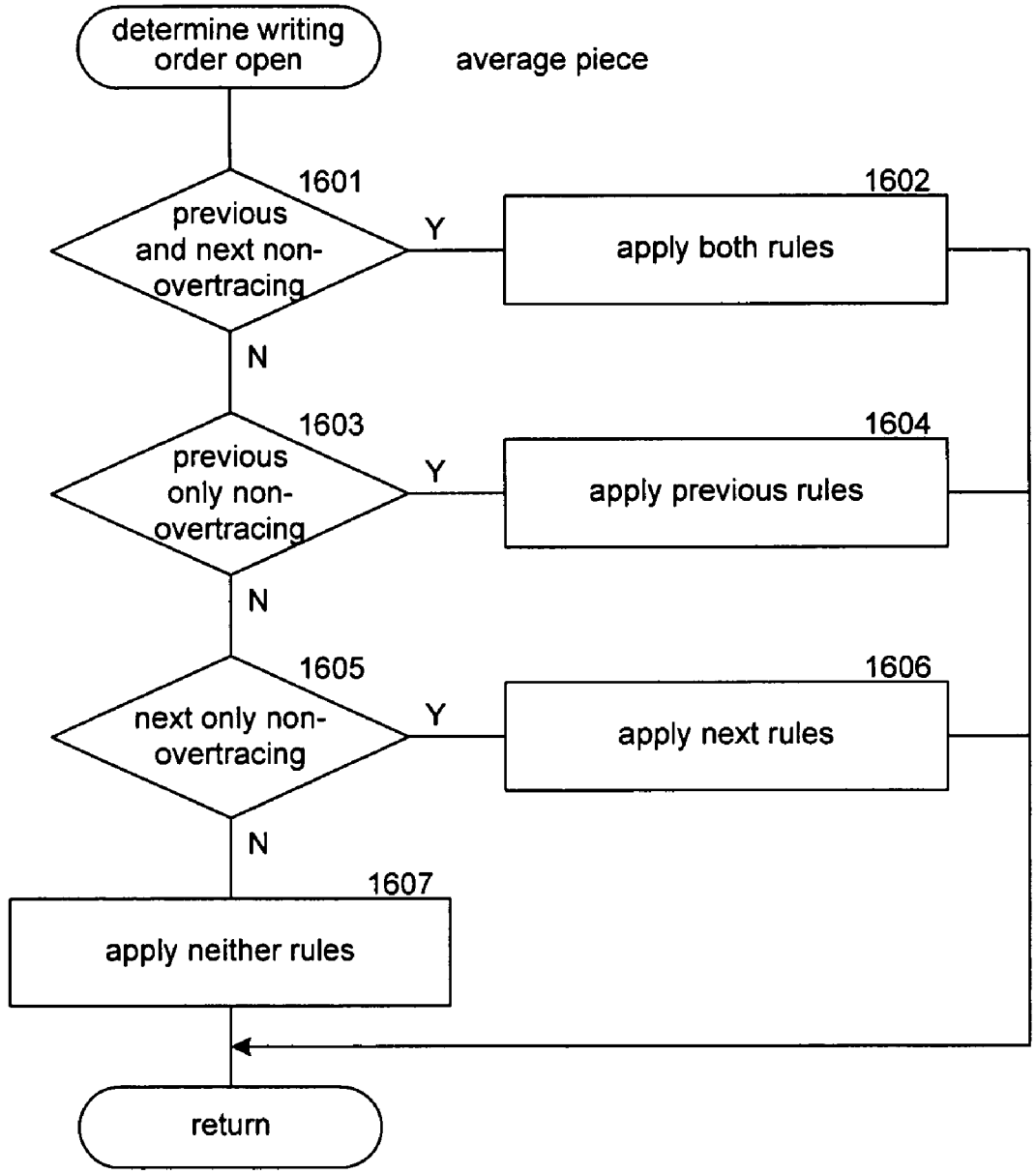
FIG. 16 is a flow diagram that illustrates the processing of the writing order determination component for an open stroke piece in one embodiment.

FIG. 16 is a flow diagram that illustrates the processing of the writing order determination component for an open stroke piece in one embodiment. The component is passed an average piece that is open and determines its writing order. The writing order is determined based on the points of the average piece which are nearest to the ending point P1 of the previous non-overtracing part of the stroke and the starting point P2 of the next non-overtracing part of the stroke. The component identifies the closest point L1 of the average piece to P1 and the closest point L2 of the average piece to P2. The component uses the following rules when determining writing order. The entire average piece is traced, the total length of the trace is the shortest, and the order follows the initial direction of the original stroke if the overtracing part is at the beginning or the end of the original stroke. FIG. 17 is a diagram that illustrates the determining of writing order for an open stroke piece in one embodiment. In decision block 1601, if P1 and P2 exist, then the component applies rules 1710 in block 1602, else the component continues at block 1603. Rule 1711 indicates that when L1 and L2 are at the same end of the average piece, then the writing order is from L1 to L2 traversing the entire length of the average piece to the other end and back to the beginning end. Rule 1712 indicates that when L1 is at an end of the average piece and L2 is not, then the writing order from L1 to L2 traverses from L1 to the other end and back to L2. Rule 1713 indicates that when L1 and L2 are at opposite ends of the average piece, then the writing order is from L1 to L2. Rule 1714 indicates that when L1 is not at an end but L2 is at an end of the average piece, then the writing order is from L1 to the end opposite L2 and then back to L2 at the other end. Rule 1715 indicates that when neither L1 nor L2 are at an end of the average piece, then the writing order is the shortest "S" shape from L1 to L2 along the entire average piece. Rule 1716 (similar to rule 1714) indicates that when L1 is not an end but L2 is at an end of the average piece, then the writing order is from L1 to L2 so that the entire average piece is traversed.

In decision block 1603, if P1 exists but P2 does not exist, then the component continues at block 1604, else the component continues at block 1605. In block 1604, the component applies rules 1720. Rule 1721 indicates that if L1 is at an end of the average piece, then the writing order is from L1 to the other end. Rule 1722 indicates that if L1 is not at an end of the average piece, then the writing order is from L1 to the nearest end and back to the other end.

In decision block 1605, if P2 exists but P1 does not exist, then the component continues at block 1606, else the component continues at block 1607. In block 1606, the component applies rules 1730. Rule 1731 indicates that if L2 is at an end of the average piece, then the writing order is from the other end to L2. Rule 1732 indicates that if L2 is not at an end of the average piece, then the writing order is from the nearest end to the other end and back to L2.

In block 1607, since neither L1 nor L2 exists, the component applies rules 1740. Rules 1741 and 1742 indicate that the writing order is in the starting order of the stroke along the entire length of the average piece.

Figure 18:
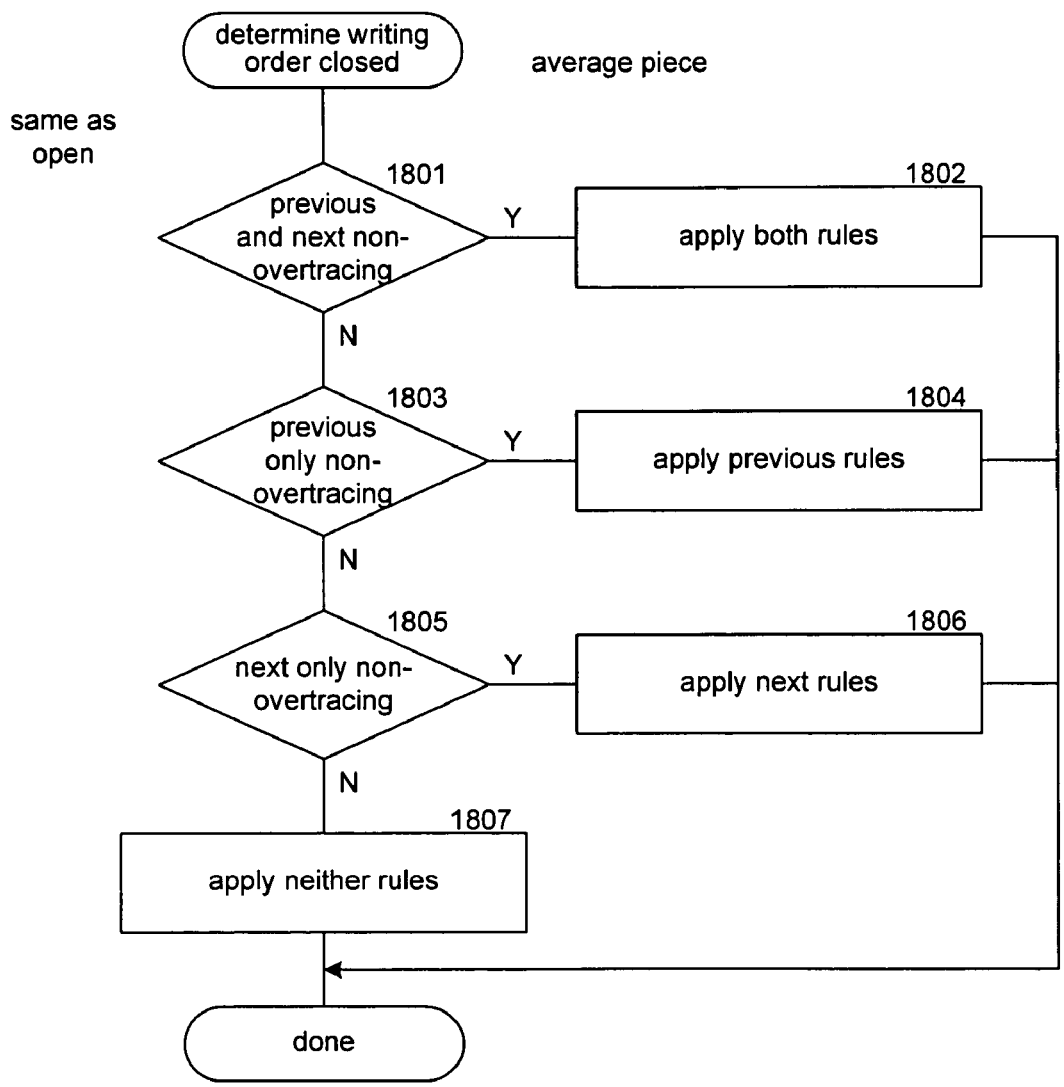
FIG. 18 is a flow diagram that illustrates the processing of the writing order determination component for a closed stroke piece in one embodiment.

FIG. 18 is a flow diagram that illustrates the processing of the writing order determination component for a closed stroke piece in one embodiment. The component is passed an average piece that is closed and determines its writing order. FIG. 19 is a diagram that illustrates the determining of writing order for a closed stroke piece in one embodiment. In decision block 1801, if P1 and P2 exist, then the component applies rules 1910 in block 1802, else the component continues at block 1803. Rule 1911 indicates that when L1 and L2 are at the same end of the average piece, then the writing order is from L1 to L2 traversing the entire length of the average piece. Rule 1912 indicates that when L1 and L2 are not near each other on the average piece, then the writing order is from L1 to L2 traversing from L1 to L1 along the entire average piece and then to L2 along the shortest route along the average piece, which may mean reversing direction.

In decision block 1803, if P1 exists but P2 does not exist, then the component applies rule 1920 in block 1804, else the component continues at block 1805. Rule 1920 indicates that the writing order is from L1 in the direction of P1 around the entire average piece to L1.

In decision block 1805, if P2 exists but P1 does not exist, then the component applies rule 1930 in block 1806, else the component continues at block 1807. Rule 1930 indicates that the writing order is from L2 in the direction of P2 around the entire average piece to L2.

In block 1807, since neither L1 nor L2 exists, the component applies rules 1940. Rules 1941 and 1942 indicate that the writing order is from the starting point of the original stroke in the starting direction of the stroke along the entire length of the average piece back to the starting point.

Clean Up Inter-Stroke Overtracing

Figure 20:
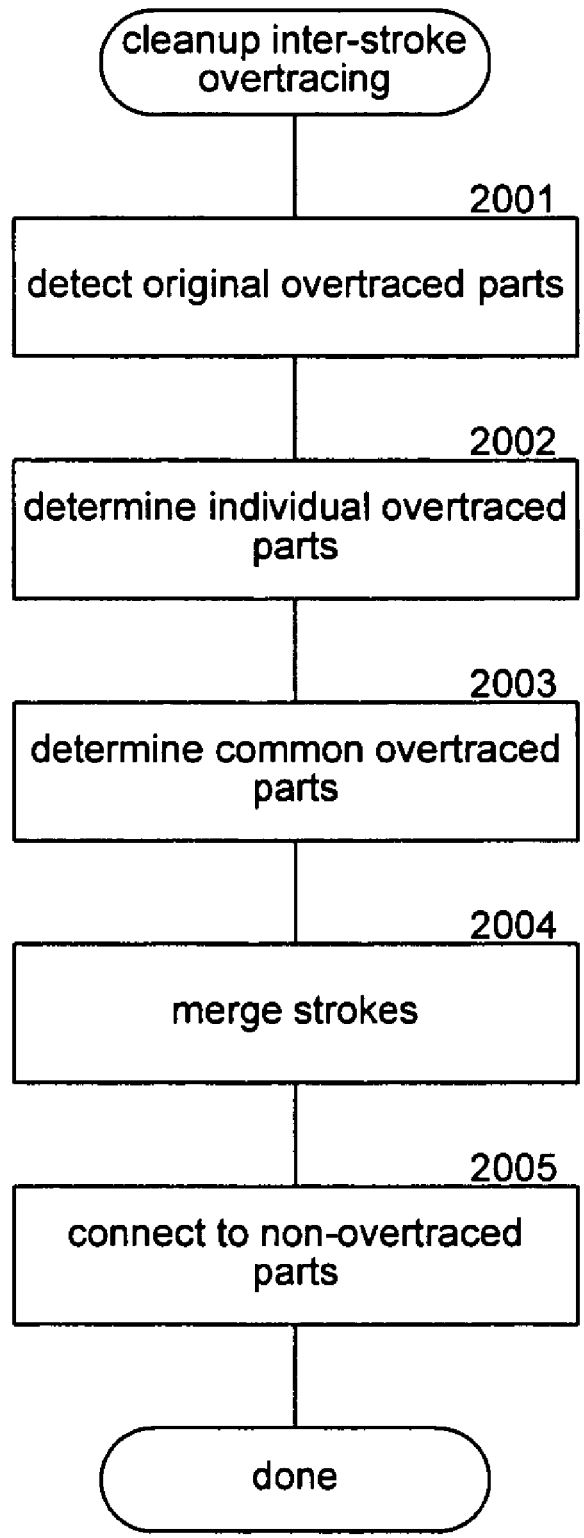
FIG. 20 is a flow diagram that illustrates the processing of the cleanup inter-stroke overtracing component in one embodiment.

FIG. 20 is a flow diagram that illustrates the processing of the cleanup inter-stroke overtracing component in one embodiment. FIG. 25 illustrates inter-stroke overtracing that is detected by the cleanup system in one embodiment. The component detects and cleans up inter-stroke overtracing when there is only one overtracing part between two strokes and there are at most two endpoints that are not on the overtracing part. Handwritings 2501-2505 illustrate strokes that satisfy this criterion. The component performs the inter-stroke overtracing cleanup on the original strokes and applies the results to the handwriting that represents the handwriting after intra-stroke overtracing cleanup is performed. The component is passed a first stroke S1 and a second stroke S2. In block 2001, the component detects the original overtracing parts of each stroke as illustrated in detail by FIG. 21. In block 2002, the component determines the individual overtracing parts for each stroke as illustrated in detail by FIG. 22. In block 2003, the component determines the common overtracing parts for each stroke as illustrated in detail by FIG. 23. In block 2004, the component merges the strokes as illustrated in detail by FIG. 24. In block 2005, the component connects the overtraced parts to the non-overtraced parts of the stroke. The component then completes.

Figure 21:
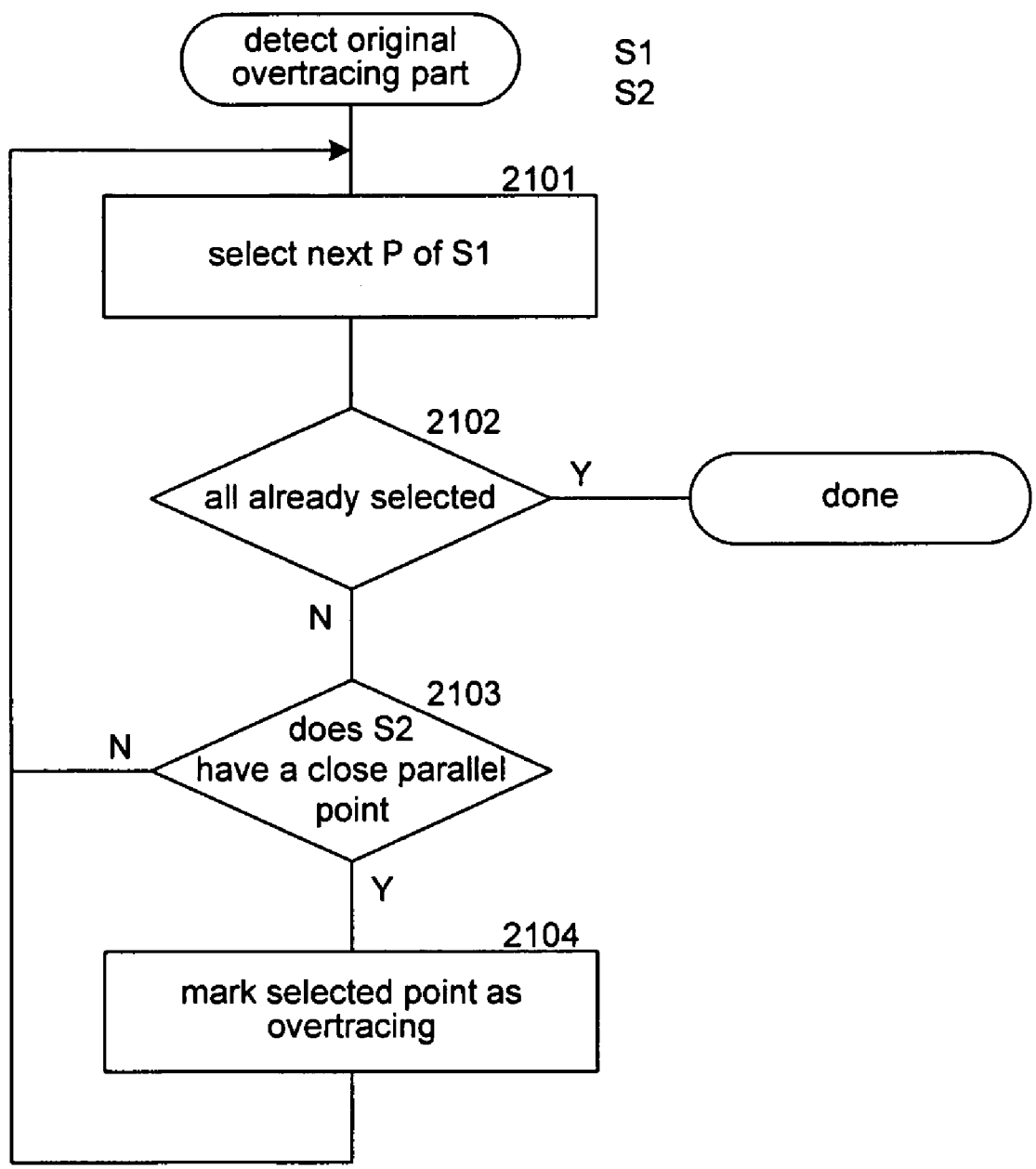
FIG. 21 is a flow diagram that illustrates the processing of the original overtraced part detection component in one embodiment.

FIG. 21 is a flow diagram that illustrates the processing of the original overtraced part detection component in one embodiment. The component is passed two strokes and detects the overtracing parts of the strokes. In block 2101, the component selects the next point of the first stroke S1. In decision block 2102, if all the points of the first stroke have already been selected, then the component completes, else the component continues at block 2103. In decision block 2103, if the second stroke S2 has a point that is close to the selected point and their directions are approximately parallel, then the selected point is an overtraced point and the component continues at block 2104, else the component loops to block 2101 to select the next point of the first stroke. In block 2104, the component marks the selected point of the first stroke as overtraced and then loops to block 2101 to select the next point of the first stroke.

Figure 22:
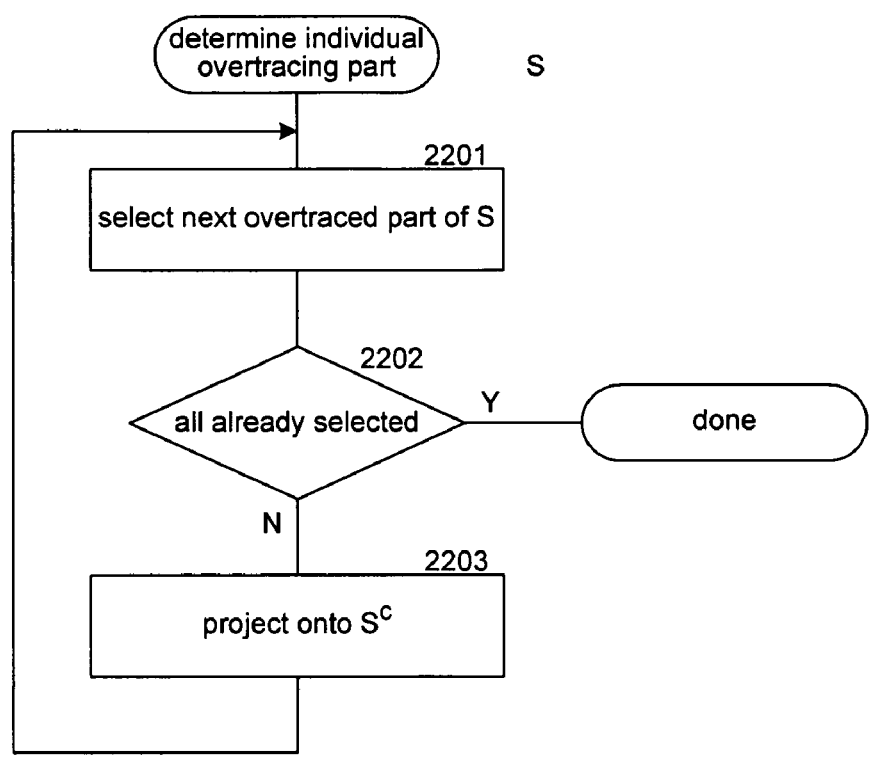
FIG. 22 is a flow diagram that illustrates the processing of the individual overtraced parts determination component in one embodiment.

FIG. 22 is a flow diagram that illustrates the processing of the individual overtraced parts determination component in one embodiment. The component is passed a stroke and projects its overtraced parts onto the intra-overtraced cleaned up handwriting. A consecutive sequence of overtraced points is an overtraced part. In block 2201, the component selects the next overtraced part of the passed stroke. In decision block 2202, if all the overtraced parts of the stroke have already been selected, then the component completes, else the component continues at block 2203. In block 2203, the component projects the overtraced part onto the original stroke and then loops to block 2201 to select the next overtraced part.

Figure 23:
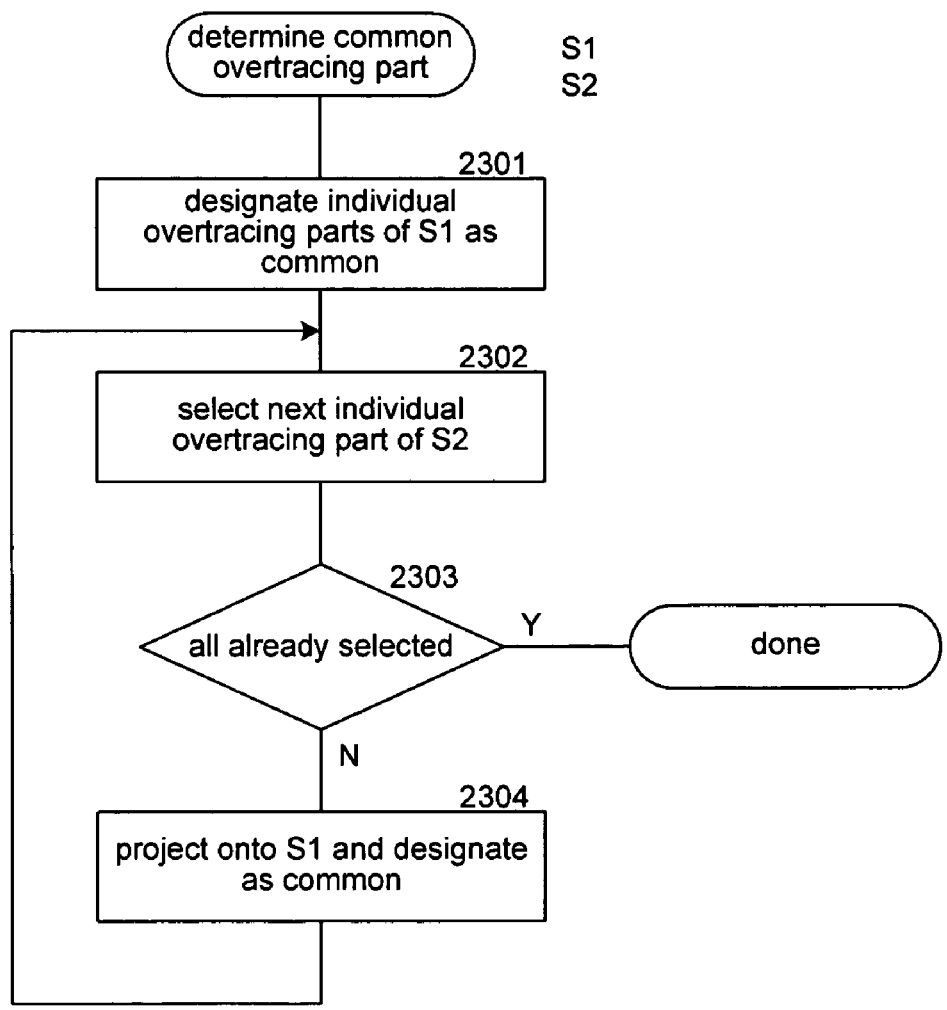
FIG. 23 is a flow diagram that illustrates the processing of the common overtraced part determination component in one embodiment.

FIG. 23 is a flow diagram that illustrates the processing of the common overtraced part determination component in one embodiment. The component is passed the individual overtraced parts of the first stroke S1 and a second stroke S2. The component then determines the overtraced parts that are common to the first stroke. In block 2301, the component designates the individual overtraced parts of the first stroke as being common. In block 2302, the component selects the next individual overtraced part of the second stroke. In decision block 2303, if all the overtraced parts of the second stroke have already been selected, then the component completes, else the component continues at block 2304. In block 2304, the component projects the selected overtraced part of the second stroke onto the first stroke on which intra-stroke overtracing cleanup has been performed and designates the projected part as common. The component then loops to block 2302 to select the next overtraced part of the second stroke.

Figure 24:
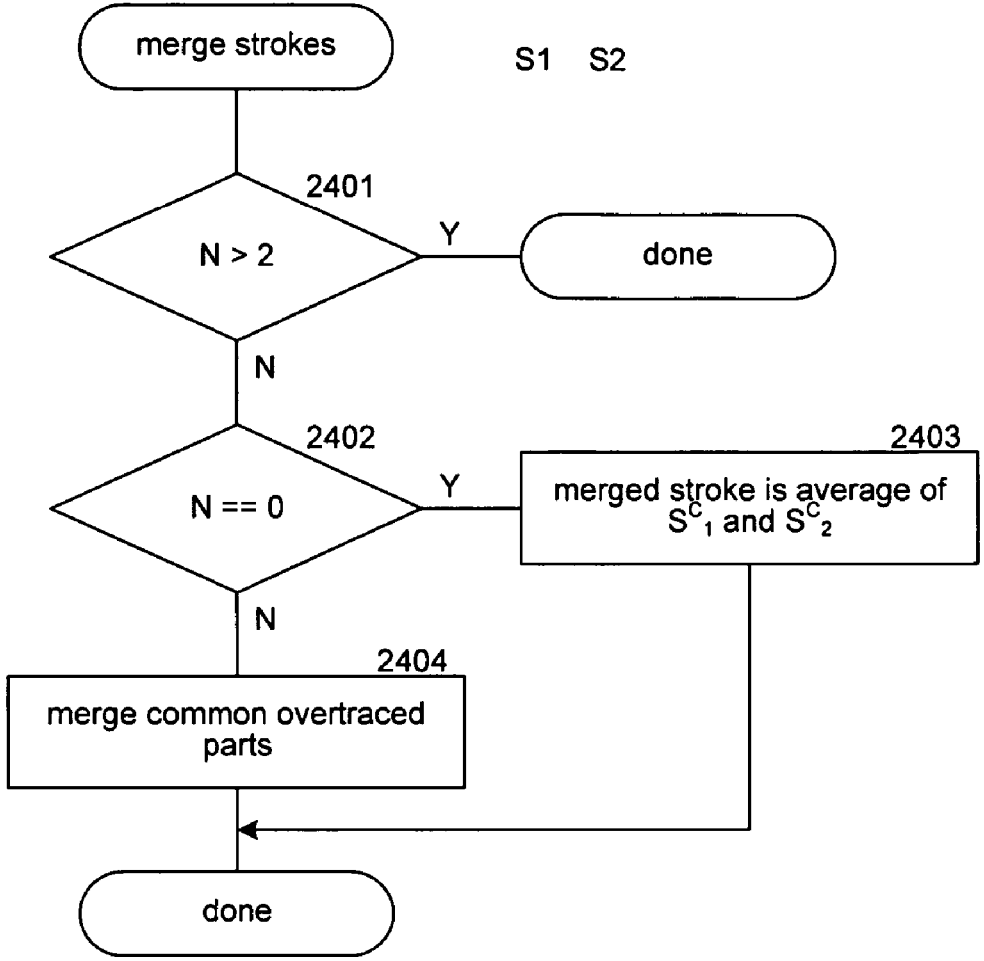
FIG. 24 is a flow diagram that illustrates the processing of the merge stroke component in one embodiment.
Figure 25:
FIG. 25 illustrates inter-stroke overtracing that is detected by the cleanup system in one embodiment.

FIG. 24 is a flow diagram that illustrates the processing of the merge stroke component in one embodiment. The component is passed a first stroke S1 and a second stroke S2. If the common overtraced parts on one of the strokes are not connected, then the component does not merge the strokes. In decision block 2401, if the number of endpoints that are not on the common overtracing part is greater than two, then the component performs no inter-stroke overtracing and the component completes, else the component continues at block 2402. In decision block 2402, if there are no endpoints that are not on the common overtraced part, then the common overtraced parts completely overlap and the component continues at block 2403, else the component continues at block 2404. In block 2403, the component merges the strokes by taking the average of the pairs of points along the strokes and then completes. In block 2404, the component merges the strokes using a linear combination, such as the average of the points, and then concatenates the average part with the original non-overtraced parts of the stroke and then completes. If one of the strokes is a loop, then the component moves its starting point to the ending point of the common overtraced part so there is no intra-stroke overtracing in the merge stroke. After connecting strokes, the component may smooth the junctions of the merged strokes and set the timestamp of the merged stroke to be the same as the first stroke.

Clean Up Correction

Figure 26:
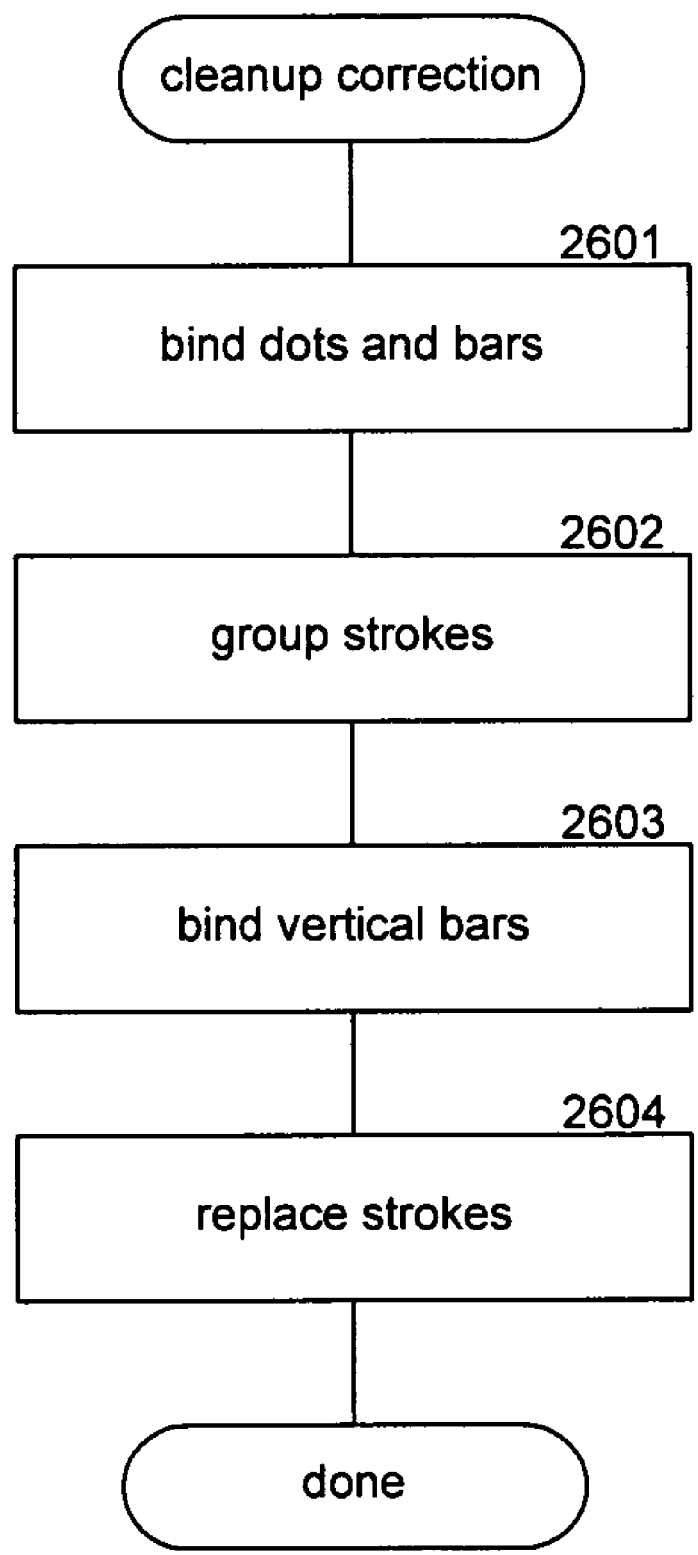
FIG. 26 is a flow diagram that illustrates the processing of the cleanup correction component in one embodiment.

FIG. 26 is a flow diagram that illustrates the processing of the cleanup correction component in one embodiment. The component cleans up corrections by replacing overwritten characters with overwriting characters. In block 2601, the component binds dots and bars to the corresponding stems as illustrated in detail in FIG. 27. In block 2602, the component groups strokes into possible characters using dynamic programming. The component represents the probability that the stroke sequence (i . . . j) is a correct letter grouping as p(i,j) and the probability of the optimal groupings of stroke sequence (i . . . j) as P(i,j), which is represented by the following recursive equation:

$$P(i, i) = p(i, i), \quad (1)$$
$$P(i, j) = \max(\{p(i, k) \times P(k + 1, j) \mid i \leq k < j\} \cup \{p(i, j)\}),$$
$$j > i$$

In the equation, the optimization of longer sequences is decomposed into the optimization of shorter sub-sequences, until each sub-sequence has only one stroke. This optimization can be performed by the dynamic programming algorithm of Table 1.

TABLE 1

Initialize an N × N matrix M using a fuzzy function (described below), where N is the total number of strokes, so that M(i, j) = p(i, j) for all i ≦ j.
Beginning from the main diagonal of M,
    for each diagonal, do
        For each element in the diagonal, do
            For every i ≦ k < j, calculate p(i, k) × P(k + 1, j);
            Find P(i j) using Equation 1 and record the index k:

$$k = \begin{cases} \arg\min_{i \leq k < j} p(i, k) \times P(k + 1, j), & \text{if } p(i, j) < P(i, j), \\ -1, & \text{if } p(i, j) = P(i, j). \end{cases}$$

Backtrace the recorded indices k to get the optimal grouping of the stroke sequence.

The component expects each sub-sequence to be a character or characters written in a single stroke. The fuzzy function p(i,j) for stroke sequence (i . . . j) is represented by the following equation:

$$p(i,j) = \lambda f_w(i,j) f_h(i,j)$$

where $f_w(i,j)$ is a width feature represented by the following equation:

$$f_w(i, j) = \begin{cases} 1, & \text{if } n = 1, \\ e^{-|w/W_{char} - 1|/\sigma_{w,1}}, & \text{if } n > 1 \text{ and } w > W_{char}, \\ \sigma_{w,2} + \dfrac{w}{W_{char}}(1 - \sigma_{w,2}), & \text{if } n > 1 \text{ and } w \leq W_{char}, \end{cases}$$

where n=j−i+1 is the number of strokes in the sub-sequence (i . . . j), w is the total width of the stroke group (the width of their slant bounding box, whose vertical edge is in the direction of the writing slant), $W_{char}$ is the average character width, and the parameters $\sigma_{w,1} > 0$ and $\sigma_{w,2} \geq 1$ control the steepness of the feature function;

where $f_h(i,j)$ is a height feature represented by the following equation:

$$f_h(i, j) = 1 + \frac{h}{T_h},$$

where h is the height of the slant bounding box of the stroke group and $T_h$ is the height of the handwritten word or line; and where λ is in the range of (0, 2/3). A smaller λ encourages stroke grouping.

Figure 28:
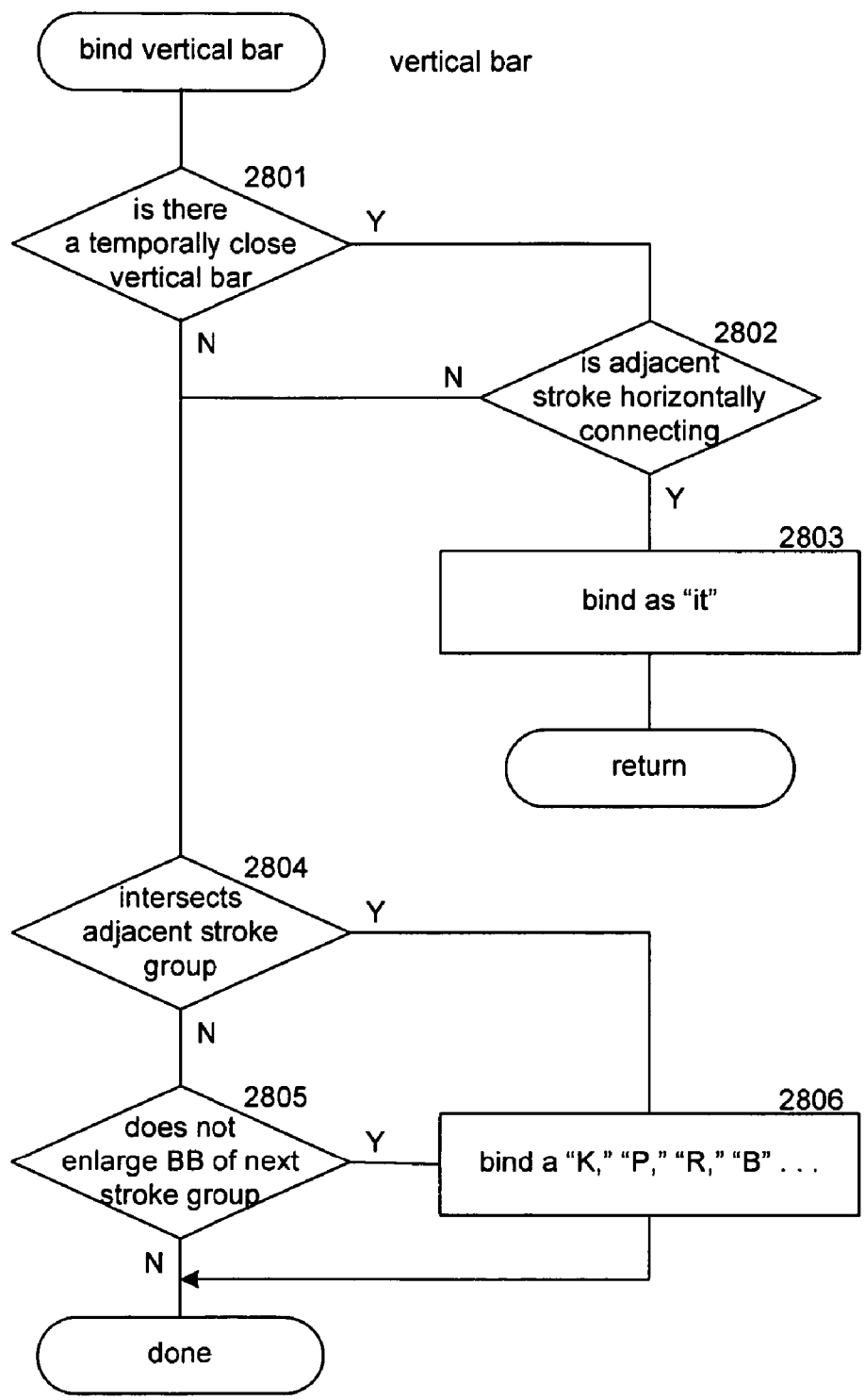
FIG. 28 is a flow diagram that illustrates the processing of the bind vertical bar component in one embodiment.

In block 2603, the component binds vertical bars to their corresponding stroke grouping as illustrated in detail by FIG. 28. In block 2604, the component replaces overwritten strokes as illustrated in detail by FIG. 29. The component then returns.

Figure 27:
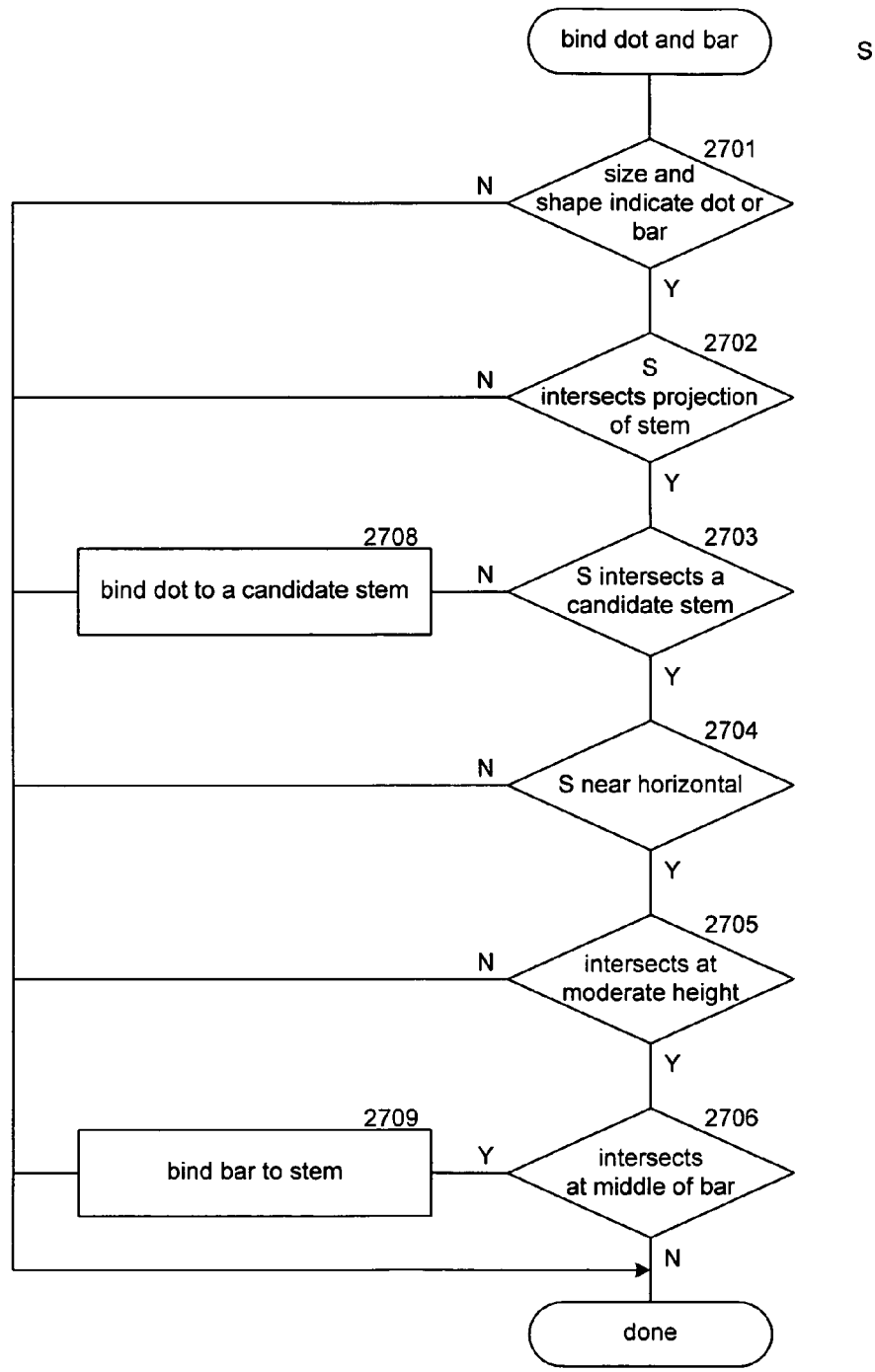
FIG. 27 is a flow diagram that illustrates the processing of the bind dot and bar component in one embodiment.

FIG. 27 is a flow diagram that illustrates the processing of the bind dot and bar component in one embodiment. The component binds dots over the letters "i" and "j" to their stems and bars for letters "t" and "f" to their stems. The component is passed a stroke that may be a dot or a bar. In blocks 2701-2702, the component determines whether the passed stroke is either a dot or a bar and thus eligible to be bound to a stem. In blocks 2703-2706, the component determines whether the passed stroke is a dot and, if not, whether it is a bar. The component then binds the stroke to the appropriate stem. In decision block 2701, if the size and shape of the passed stroke indicates it could be dot or a bar, then the component continues at block 2702, else the component completes. In decision block 2702, if the passed stroke intersects the projection of a stem, then the stroke may be a dot or a bar and the component continues at block 2703, else the component completes. In block 2703, if the stroke intersects a candidate stem, then the stroke may be a bar, else the stroke is a dot and the component binds the dot to the candidate stem in block 2708 and then completes. In block 2704, if the stroke is near horizontal, then it may be a bar and the component continues at block 2705, else the component completes. In decision block 2705, if the stroke intersects a candidate stem at a moderate height, then the stroke may be a bar and the component continues at block 2706, else the component completes. In decision block 2706, if the stem intersects the middle of the stroke, then the stroke is assumed to be a bar and the component binds the bar to the stem in block 2709. The component then completes.

FIG. 28 is a flow diagram that illustrates the processing of the bind vertical bar component in one embodiment. The dynamic grouping of strokes into characters as described above may not group vertical bars of the letters "B," "D," "E," and so on to the rest of the letter because the width of these capital letters is often larger than the calculated average character width. The component binds a passed vertical bar to the corresponding group(s) of strokes. In decision block 2801, if there is a temporally close vertical bar to the passed vertical bar, then the vertical bars may form an "H" and the component continues at block 2802, else the component continues at block 2804. In decision block 2802, if there is an adjacent stroke that horizontally connects the vertical bars, then the component binds the vertical bars and the horizontal stroke as an "H" in block 2803 and completes, else the component continues at block 2804. In decision block 2804, if the passed vertical bar intersects an adjacent group of strokes, then the component continues at block 2806, else the component continues at block 2805. In decision block 2805, if the passed vertical bar does not enlarge the bounding box of an adjacent group of strokes, then the component continues at block 2806, else the component completes. In block 2806, the component binds the passed vertical bar to the adjacent group of strokes as a "B," "E," "K," and so on and then completes.

Figure 29:
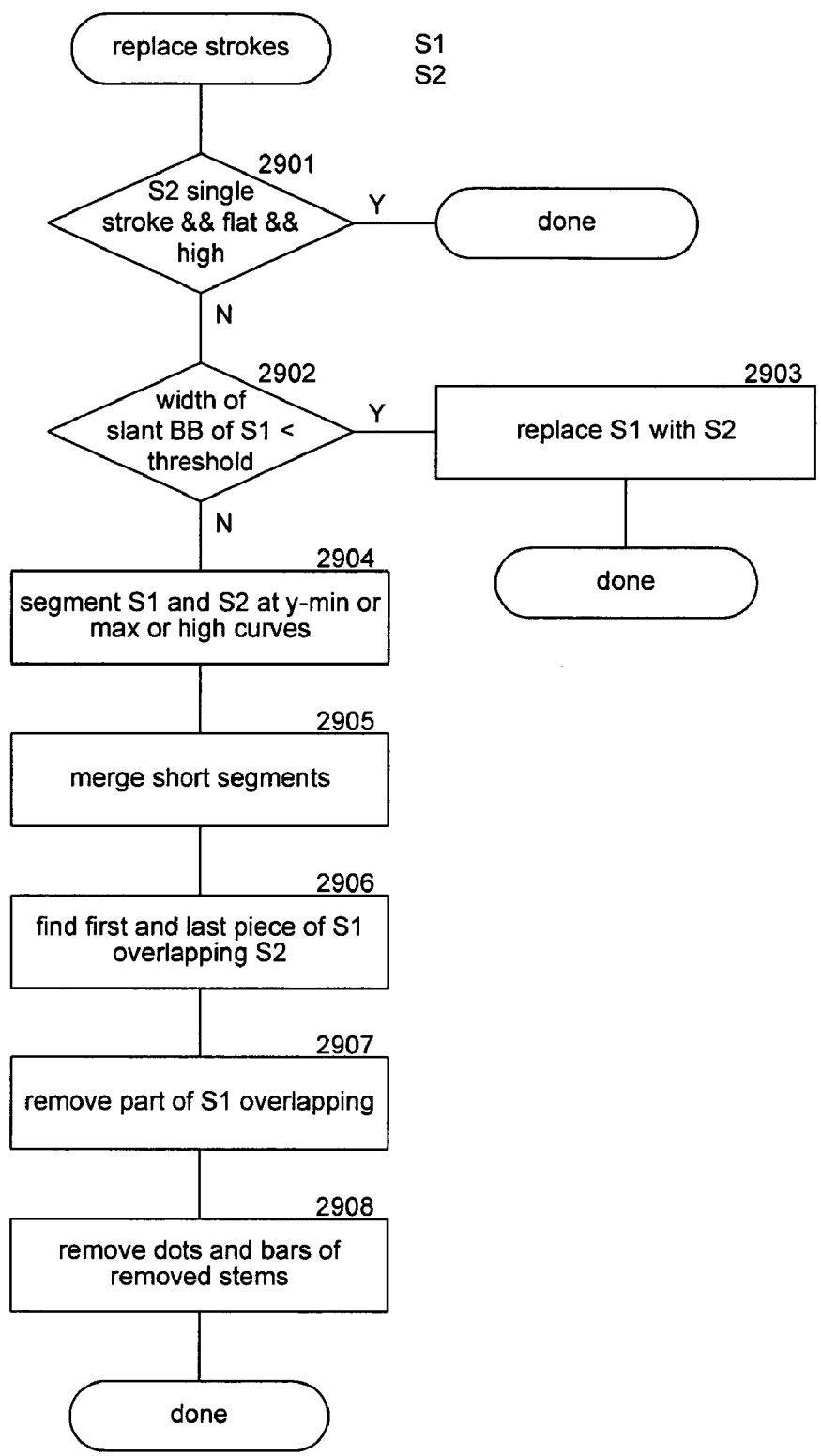
FIG. 29 is a flow diagram that illustrates the processing of the replace strokes component in one embodiment.
Figure 30:
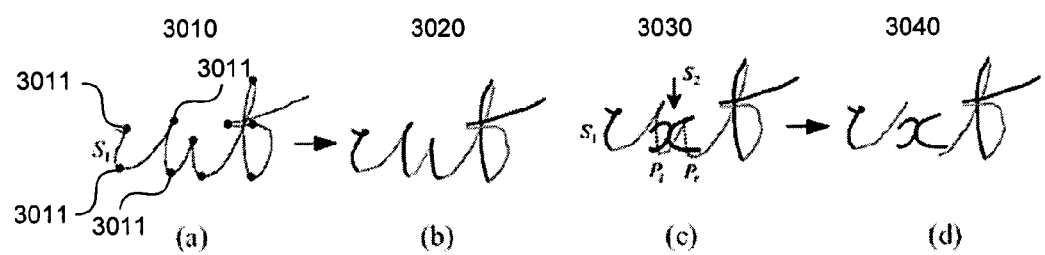
FIG. 30 illustrates the replacement of an overwritten group with an overwriting group in one embodiment.

FIG. 29 is a flow diagram that illustrates the processing of the replace strokes component in one embodiment. The component is passed a pair of groups of strokes and determines whether an overwritten group S1 should be removed and replaced by the overwriting group S2. FIG. 30 illustrates the replacement of an overwritten group with an overwriting group in one embodiment. If the slant bounding boxes of the two groups overlap, then the groups are eligible for replacement. In decision block 2901, if the overwriting group contains a single stroke and its bounding box is flat and above a threshold height, then the group may be an undetected bar and the component completes, else the component continues at block 2902. In decision block 2902, if the width of the slant bounding box of the overwritten group is small enough to accommodate the overwriting group, then the component replaces the overwritten group with the overwriting group in block 2903 and completes, else it continues at block 2904. In block 2904, the component segments the strokes of the groups into y-minimum points, y-maximum points, and high curvature points as illustrated by points 3011 of handwriting 3010. In block 2905, the component merges the short segments as illustrated by handwriting 3020. In block 2906, the component finds the first and last pieces of the overwritten group that overlap the overwriting group as illustrated by $P_l$ and $P_r$ of handwriting 3030. In block 2907, the component removes the part of the overwritten group that is overlapped by the overwriting group as illustrated by handwriting 3040. In block 2908, the component removes the dots and bars of the removed stems, if any, and then completes.

Clean Up Touchup Strokes

Figure 31:
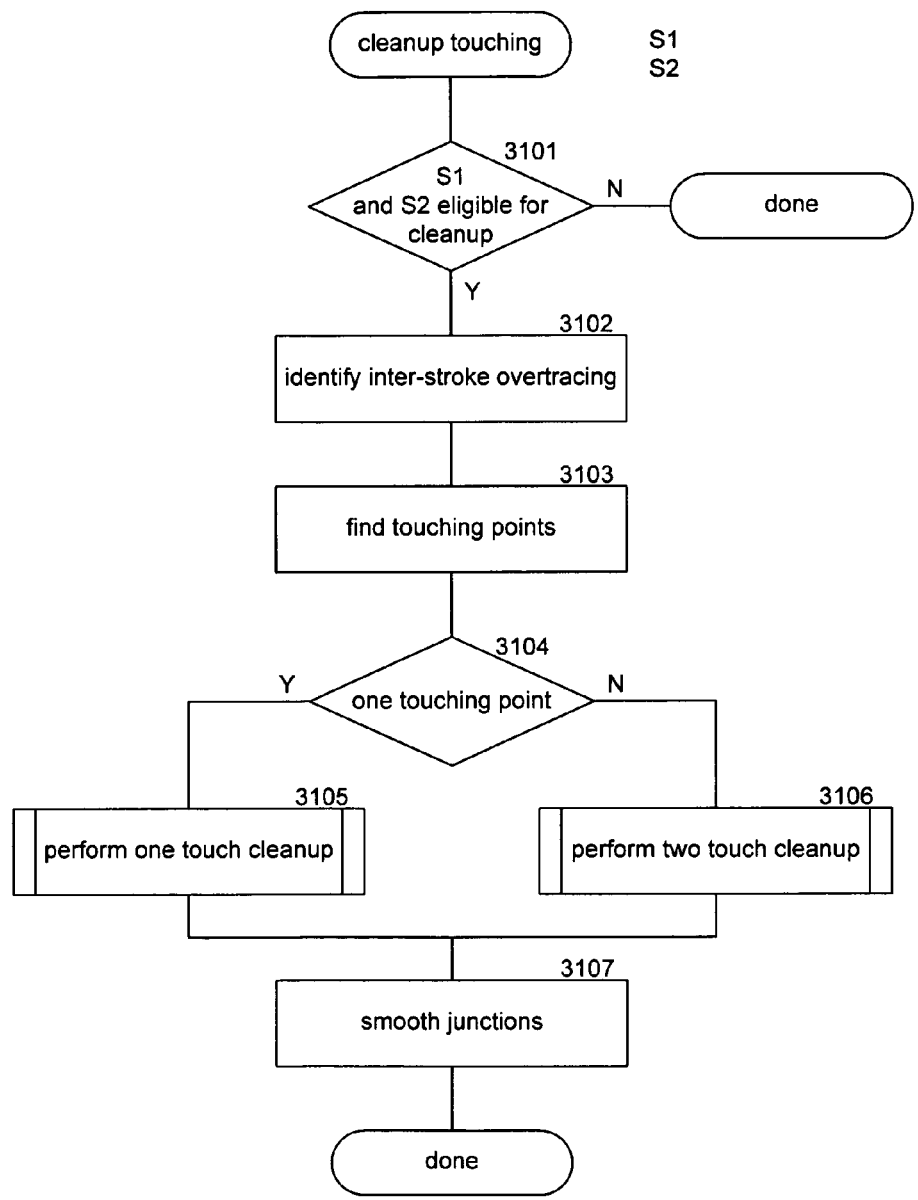
FIG. 31 is a flow diagram that illustrates the processing of the cleanup touchup component in one embodiment.
Figure 32:
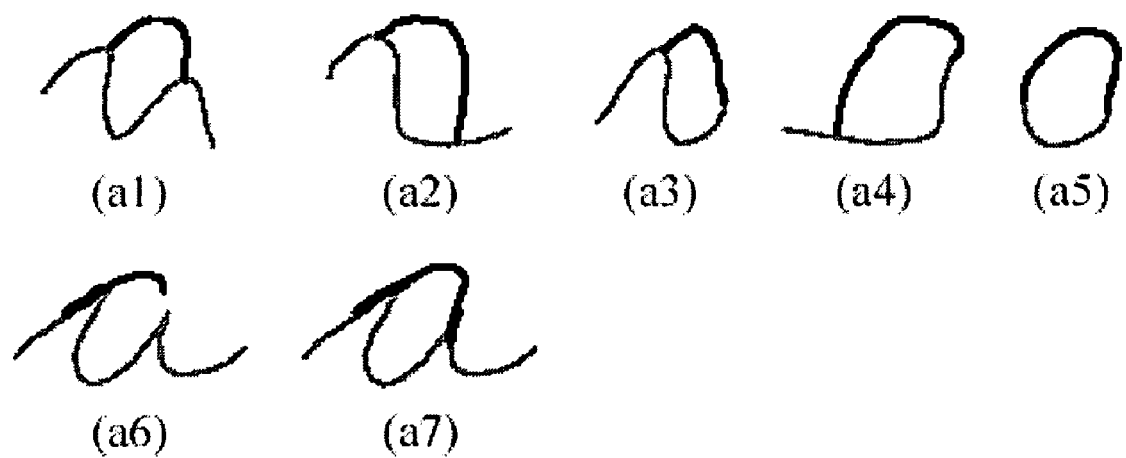
FIG. 32 illustrates the cleanup of touchup strokes in one embodiment.

FIG. 31 is a flow diagram that illustrates the processing of the cleanup touchup component in one embodiment. The component merges two strokes in which a touching up stroke S2 touches up a touched up stroke S1. The component is passed the touchup strokes S1 and S2. FIG. 32 illustrates the cleanup of touchup strokes in one embodiment. Handwritings 3201-3207 illustrate touching up examples in which the touching up stroke is darker than the touched up stroke. In decision block 3101, if the passed strokes are eligible for cleanup, then the component continues at block 3102, else the component completes. Two strokes are eligible for cleanup if the strokes satisfy several conditions. One condition is that the touching up stroke is relatively short, was slowly written, and does not intersect a third stroke. Another condition is that the touching up stroke in the part of the touched up stroke between the touching points is relatively simple, such as with no self intersections and no fluctuations. Another condition is that one of the touching points on the touched up stroke is a high curvature point or an endpoint. If only one of the touching points is an endpoint or a high curvature point, then the stroke piece of the touched up stroke containing the touching points should not be a near vertical straight line to avoid mistreatment of the letters "p," "b," and so on. Another condition is that inter-stroke overtracing only occurs near the endpoints of the touching up stroke. In block 3102, the component identifies the inter-stroke overtracing of the strokes. In block 3103, the component identifies the touching points of the stroke. In decision block 3104, if there is one touching point, then the component continues at block 3105, else the component continues at block 3106. In block 3105, the component invokes a component to perform one-touch-point cleanup as detailed in FIG. 33. In block 3106, the component invokes a component to perform two-touch-point cleanup as detailed in FIG. 35. In block 3107, the component smoothes the junctions of the touched up stroke and then completes.

Figure 33:
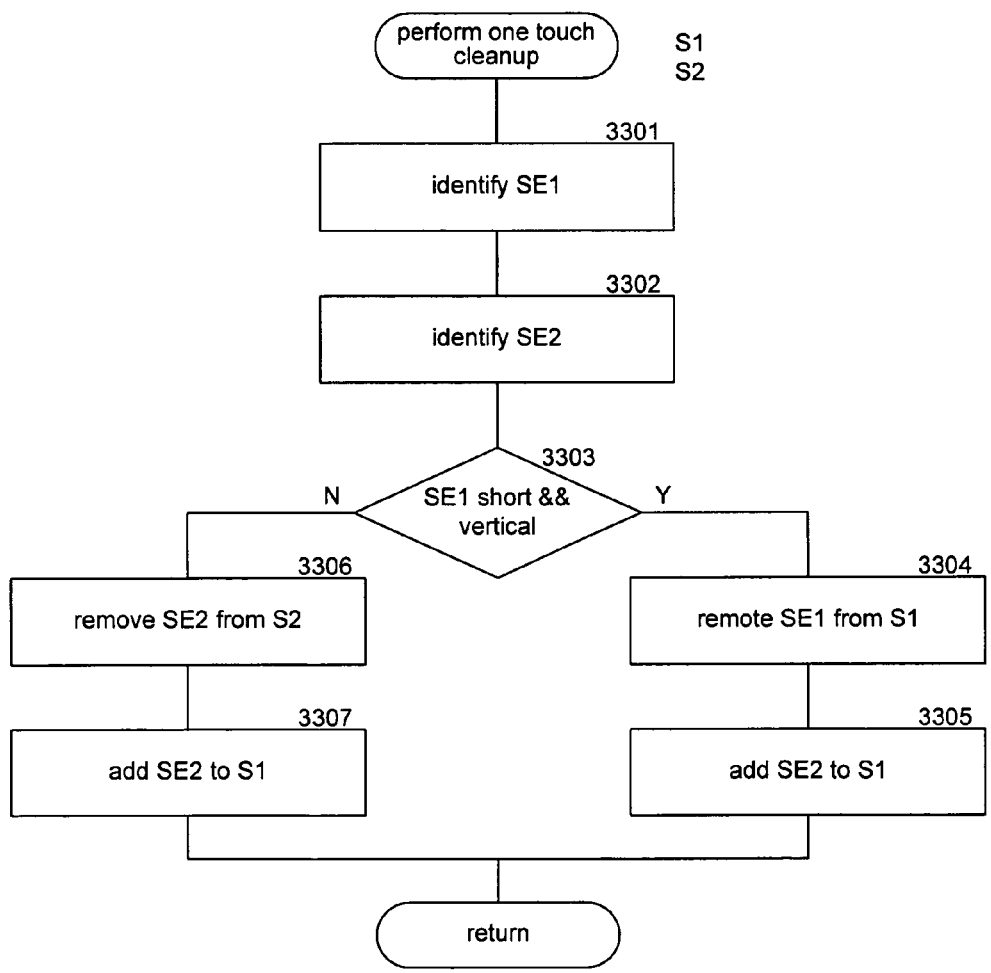
FIG. 33 is a flow diagram that illustrates the processing of the perform one-touch-point cleanup component in one embodiment.
Figure 34:
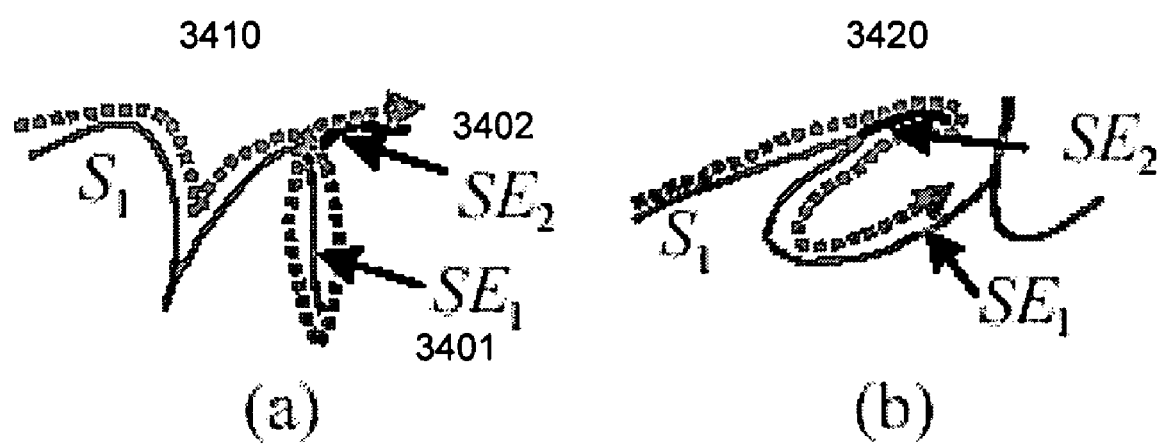
FIG. 34 illustrates the writing order of touching strokes that touch at one point in one embodiment.

FIG. 33 is a flow diagram that illustrates the processing of the perform one-touch-point cleanup component in one embodiment. The component is passed the touching up stroke S2 and the touched up stroke S1. FIG. 34 illustrates the writing order of touching strokes that touch at one point in one embodiment. In blocks 3301-3302, the component identifies the part SE1 of S1 from the touching point of the touched up stroke to the endpoint 3401 and the part SE2 of S2 from the touching point on the touching up stroke to the endpoint 3402. In decision block 3303, if SE1 is short and relatively vertical as with handwriting 3410 (e.g., "r" in which the horizontal stroke is touching up the vertical stroke), then the component continues at block 3304, else the component continues at block 3306. In block 3304, the component backtraces SE1 to establish the writing order. In block 3305, the component concatenates SE2 to the touched up stroke and then completes. In block 3306, the component backtraces SE2 to establish the writing order as in handwriting 3420. In block 3307, the component concatenates SE2 onto the inserts the backtracing into the touched up stroke and then completes.

Figure 35:
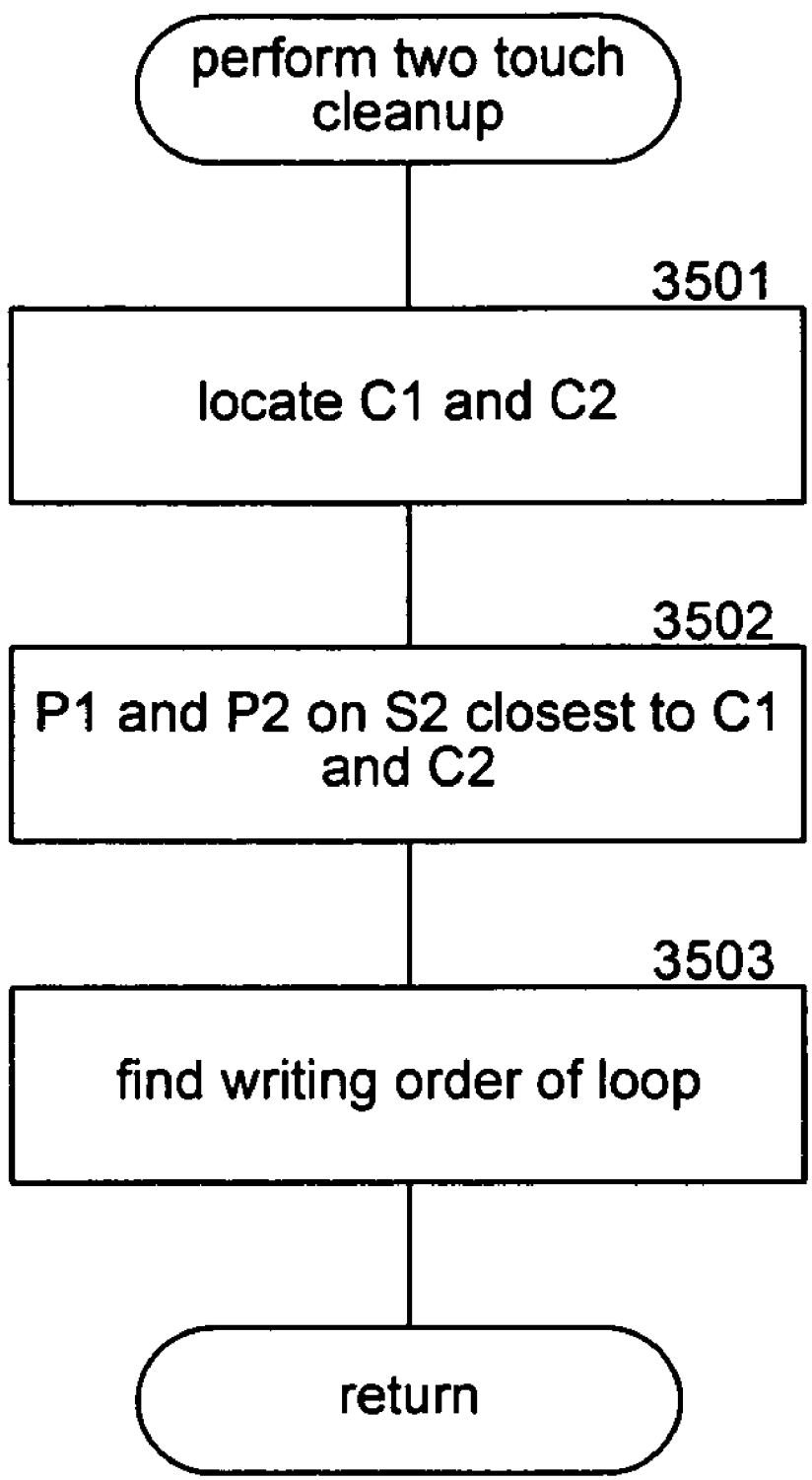
FIG. 35 is a flow diagram that illustrates the processing of the perform two-touch-point cleanup component in one embodiment.
Figure 36:
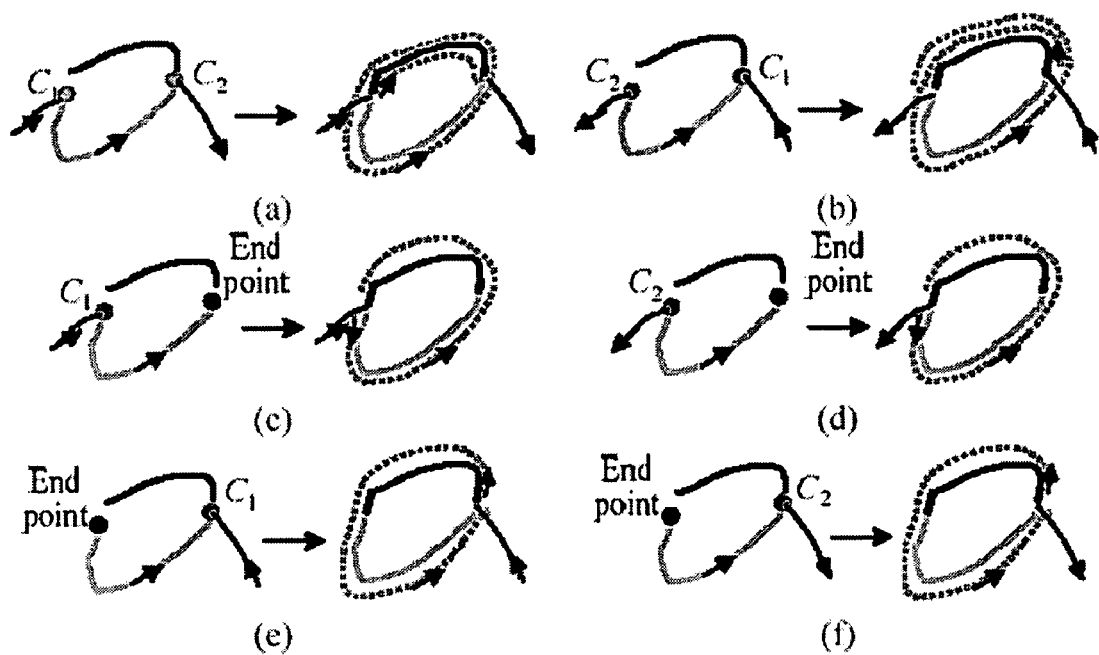
FIG. 36 illustrates the writing order of touching strokes that touch in two places in one embodiment.

FIG. 35 is a flow diagram that illustrates the processing of the perform two-touch-point cleanup component in one embodiment. The component is passed the touched up stroke S1 and the touching up stroke S2. In block 3501, the component locates points C1 and C2 of the strokes which are within a distance from the touching points and are either the highest curvature or the endpoints of the touched up stroke. In block 3502, the component finds points P1 and P2 on the touching up stroke that are closest to C1 and C2, respectively. In block 3503, the component finds the writing order of the loop formed by the touched up stroke and the touching up stroke. The sub-stroke SS1 of S1 between C1 and C2 and the sub-stroke SS2 of S2 between P1 and P2 form a closed loop whose direction is typically counterclockwise. However, if SS2 is to the right of SS1 and the stroke piece of S1 containing SS1 is a short straight line (e.g., "p" or "b"), then the loop should be clockwise. FIG. 36 illustrates the writing order of touching strokes that touch in two places in one embodiment. The arrows indicate the direction of the touched up stroke and the dashed line indicates the determined writing order of the resulting stroke.

Clean Up Insertion

Figure 37:
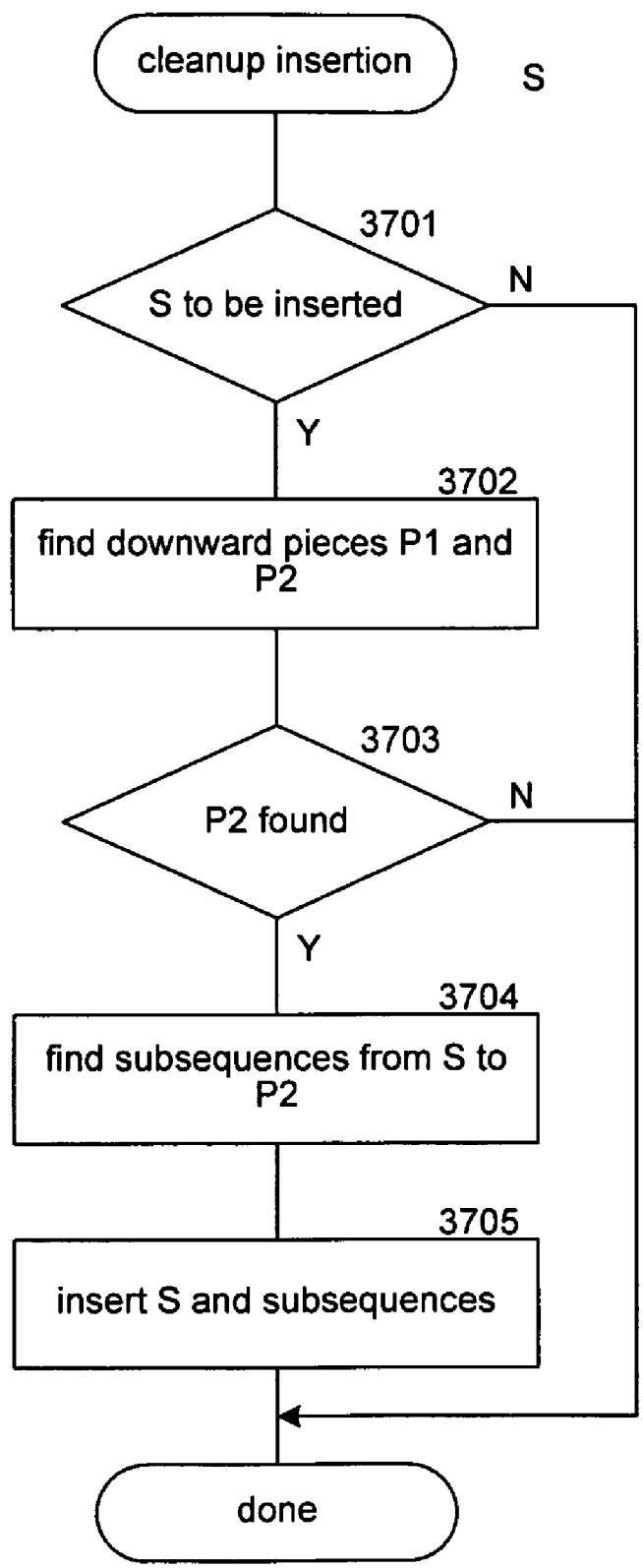
FIG. 37 is a flow diagram that illustrates the processing of the cleanup insertion component in one embodiment.

FIG. 37 is a flow diagram that illustrates the processing of the cleanup insertion component in one embodiment. The component cleans up handwriting that corresponds to the writer inserting a new character into a word after the word has been written with the correct temporal ordering of the characters. In decision block 3701, if the stroke is to be inserted, then the component continues at block 3702, else the component completes. The component considers strokes that are written later at their intended places to be to-be-inserted strokes. However, the cleanup system processes late dots and bars in late stroke reordering, rather than in insertion cleanup. Also, the timestamp of the to-be-inserted stroke should be either before the stroke piece at its left or after the stroke piece on its right. In block 3702, the component finds the downward pieces P1 and P2 such that the stroke is at the right of P1 and at the left of P2 and the distance between them is the shortest in all pairs of encompassing strokes. In decision block 3703, if there is no P2, then the component cannot perform insertion cleanup and the component completes, else the component continues at block 3704. In block 3704, the component collects the subsequence of strokes after the to-be-inserted stroke so that all of them are between P1 and P2. In block 3705, the component inserts the stroke and the collected subsequence and then completes. If P1 is not found, then the component inserts the stroke and the subsequence before the rest of the strokes. If P1 and P2 are disconnected, then the component inserts the stroke and the subsequence right after the stroke containing P1. Otherwise the component breaks the stroke containing P1 and P2 at the midpoint and inserts the to-be-inserted stroke and the subsequence after the midpoint.

Reorder Late Strokes

Figure 38:
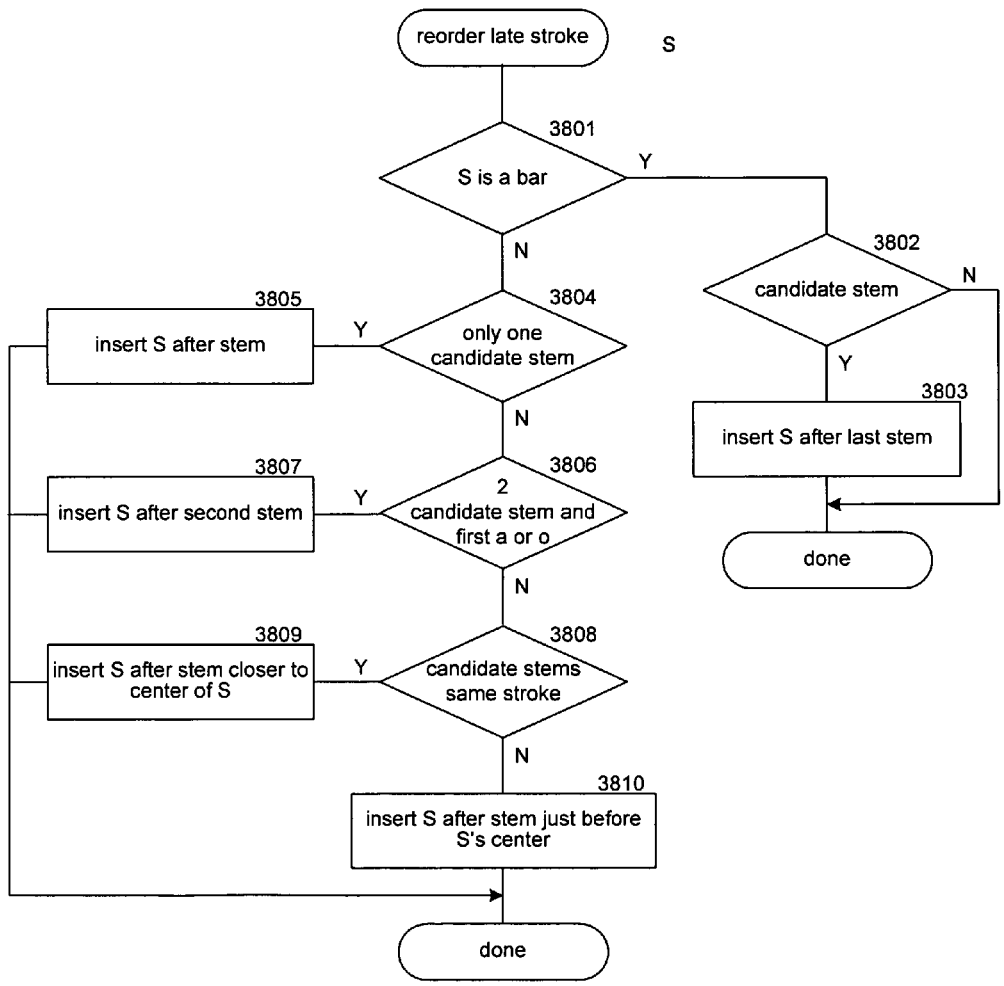
FIG. 38 is a flow diagram that illustrates the processing of the reorder late stroke component in one embodiment.

FIG. 38 is a flow diagram that illustrates the processing of the reorder late stroke component in one embodiment. The component is passed a stroke that is a dot or a bar and reorders its position to be before or after a corresponding stem. The component may also reorder single quotation marks and slashes on the letter "x." In decision block 3801, if the stroke is a bar, then the component continues at block 3802, else the component continues in block 3804. In decision block 3802, if the bar has a candidate stem, then the component inserts the stroke after the last candidate stem in block 3803. The component then completes. In decision block 3804, if the dot has only one candidate stem, then the component inserts the stroke after the candidate stem in block 3805 and then completes, else the component continues at block 3806. In decision block 3806, if the dot has two candidate stems and the first candidate stem may correspond to the letter "a" or "o," then the component inserts the stroke after the second candidate stem in block 3807 and then completes, else the component continues at block 3808. In decision block 3808, if the candidate stems are part of the same stroke, then the component continues at block 3809, else the component continues at block 3810. In block 3809, the component inserts the stroke after the candidate stem closer to the center of the stroke and then completes. In block 3810, the component inserts the stroke after the candidate stem just before the stroke center and then completes.

Although the subject matter has been described in language specific to structural features and/or methodological acts, it is to be understood that the subject matter defined in the appended claims is not necessarily limited to the specific features or acts described above. For example, the component may reverse the direction of short strokes to reduce noise within the handwriting. Rather, the specific features and acts described above are disclosed as example forms of implementing the claims. Accordingly, the invention is not limited except as by the appended claims.

I claim:

1. A method in a computing device having a processor for cleaning up handwriting, the method comprising:

under control of the processor:

receiving handwriting of a user that has been digitized;

analyzing the handwriting to identify strokes that satisfy a cleanup criterion, each stroke representing a sequence of points starting when the user places a pen tip on a writing tablet and ending when the user lift the pen tip off the writing tablet; and when strokes have been identified as satisfying the cleanup criterion, performing cleanup on the handwriting wherein a cleanup criterion includes an intra-stroke overtracing criterion indicating that when the user has traced over a portion of a stroke with another portion of the same stroke in an attempt to clarify the handwriting, the cleanup includes replacing the overtraced and overtracing portions with an averaged portion, wherein a cleanup criterion includes an inter-stroke overtracing criterion indicating that when the user has traced over one stroke with a different stroke in an attempt to clarify the handwriting, the cleanup includes replacing the overtraced and the overtracing strokes with a merged stroke that includes common overtraced parts of the strokes, wherein a cleanup criterion includes a correction criterion indicating a correction occurring when the user has overwritten one character with another character, the cleanup including replacing the overwritten character with the overwriting character, wherein a cleanup criterion includes a touch up stroke criterion indicating a stroke touch up correction occurring when the user wrote a touch up stroke to complete an existing stroke, the cleanup including merging the touch up stroke and the existing stroke, and wherein a clean up criterion includes an insertion criterion indicating an insertion correction occurring when the user wrote a character between two existing characters, the cleanup including inserting the character between the two existing characters.

2. The method of claim 1 including displaying the cleaned up handwriting.

3. The method of claim 1 wherein the cleanup includes temporally reordering strokes to improve handwriting recognition.

4. The method of claim 1 including determining a writing order for an average piece that replaces intra-stroke overtracing.

5. The method of claim 1 wherein groups of strokes are classified as a character without performing character recognition.

6. The method of claim 1 wherein the cleanup includes temporally reordering strokes inserted into a sequence of strokes as a correction.

7. The method of claim 1 wherein the cleanup includes temporally reordering late strokes.

8. The method of claim 1 wherein the performing cleanup on the handwriting includes performing inter-stroke overtracing cleanup by:
- detecting original overtraced parts of a first stroke and a second stroke;
- determining individual overtraced parts from the detected original overtraced parts;
- determining common overtraced parts from the determined individual overtraced parts;
- merging the first stroke and the second stroke into a merged stroke factoring in the determined common overtraced parts; and
- connecting the non-overtraced parts to the merged stroke.

9. The method of claim 1 wherein the performing cleanup on the handwriting includes performing intra-stroke overtracing cleanup by:
- detecting intra-stroke overtracing points of a stroke;
- computing average stroke pieces of the overtraced points;
- connecting the average stroke pieces;
- determining writing order of the connected average stroke pieces; and
- connecting the non-overtraced pieces to the connected average stroke pieces.

10. A computer-readable storage medium containing instructions for controlling a computer system to clean up handwriting, by a method comprising:
- receiving handwriting of a user that has been digitized;
- performing intra-stroke overtracing cleanup of the handwriting, an intra-stroke overtracing occurring when the user overtraces a portion of a stroke with another portion of the stroke, the intra-stroke overtracing cleanup including replacing the overtraced and overtracing portions with an averaged portion;
- performing inter-stroke overtracing cleanup of the handwriting, an inter-stroke overtracing occurring when the user overtraces one stroke with another stroke, the inter-stroke overtracing cleanup including replacing the overtraced and overtracing strokes with a merged stroke;
- performing correction cleanup of the handwriting, a correction occurring when the user overwrites one character with another character, the correction cleanup including replacing the overwritten character with the overwriting character;
- performing touch up stroke cleanup of the handwriting, a stroke touch up occurring when the user writes a stroke to complete an existing stroke, the touch up cleanup including merging the short and the existing stroke; and
- performing insertion cleanup of the handwriting, an insertion occurring when the user writes a character between two existing characters, the insertion cleanup including inserting the character between the two existing characters.

11. The computer-readable storage medium of claim 10 including displaying the cleaned up handwriting.

12. The computer-readable storage medium of claim 10 wherein the cleanup includes temporally reordering cleaned up strokes to improve handwriting recognition.

13. The computer-readable storage medium of claim 10 including determining a writing order for strokes of the cleaned up handwriting.

14. The computer-readable storage medium of claim 10 including grouping strokes into characters without performing character recognition.

15. The computer-readable storage medium of claim 10 including temporally reordering late strokes.

16. A computer system for cleaning up handwriting, comprising:
- a storage device containing:
  - a store that contains handwriting that has been digitized;
  - a component having computer-executable instructions that preprocesses the handwriting;
  - a component having computer-executable instructions that analyzes the handwriting and the preprocessed handwriting to determine whether a cleanup criterion has been satisfied; and
  - a component having computer-executable instructions that cleans up the handwriting when the cleanup criterion is satisfied; and
- a processor for executing the computer-executable instructions of the components contained on the storage device
- wherein a cleanup criterion includes an intra-stroke overtracing criterion indicating that the user has overtraced a portion of a stroke with another portion of the stroke and the cleanup includes replacing the overtraced and overtracing portions with an averaged portion,
- wherein a cleanup criterion includes an inter-stroke overtracing criterion indicating that the user has overtraced one stroke with another stroke and the cleanup includes replacing the overtraced and the overtracing strokes with a merged stroke,
- wherein a cleanup criterion includes a correction criterion indicating a correction occurring when the user has overwritten one character with another character, the cleanup including replacing the overwritten character with the overwriting character,
- wherein a cleanup criterion includes a touch up stroke criterion indicating a stroke touch up correction occurring when the user wrote a touch up stroke to complete an existing stroke, the cleanup including merging the touch up stroke and the existing stroke, and
- wherein a clean up criterion includes an insertion criterion indicating an insertion correction occurring when the user wrote a character between two existing characters, the cleanup including inserting the character between the two existing characters.

17. The computer system of claim 16 including a component to display the cleaned up handwriting.

* * * * *